(12) United States Patent
O'Neill et al.

(10) Patent No.: US 7,339,925 B2
(45) Date of Patent: Mar. 4, 2008

(54) TELECOMMUNICATIONS ROUTING

(75) Inventors: Alan W O'Neill, Adelaide (AU); Mathew S Corson, Chatam, NJ (US)

(73) Assignee: British Telecommunications public limited company, London (GB)

(*) Notice: Subject to any disclaimer, the term of this patent is extended or adjusted under 35 U.S.C. 154(b) by 1095 days.

(21) Appl. No.: 10/381,939

(22) PCT Filed: Oct. 26, 2001

(86) PCT No.: PCT/GB01/04756

§ 371 (c)(1), (2), (4) Date: Mar. 31, 2003

(87) PCT Pub. No.: WO02/35793

PCT Pub. Date: May 2, 2002

(65) Prior Publication Data

US 2004/0048618 A1   Mar. 11, 2004

(30) Foreign Application Priority Data

Oct. 26, 2000   (EP) ................... 00309450

(51) Int. Cl.
*H04L 12/56* (2006.01)

(52) U.S. Cl. ............... 370/356; 370/400; 455/445

(58) Field of Classification Search ........... 370/328, 370/329, 331, 400, 401, 356; 455/445
See application file for complete search history.

(56) References Cited

U.S. PATENT DOCUMENTS 5,117,422 A   5/1992 Hauptschein et al.

(Continued)

FOREIGN PATENT DOCUMENTS

AU   5424496   10/1996

(Continued)

OTHER PUBLICATIONS

"Tutorial: Mobile Networking Through Mobile IP", Charles E. Perkins, IEEE Internet Computing Oneline, 1997.

(Continued)

*Primary Examiner*—Min Jung
(74) *Attorney, Agent, or Firm*—Nixon & Vanderhye P.C.

(57) ABSTRACT

In a packet switched network, first said network address are allocated to a first mobile node being served via a communications link by a first access node, at least a first routing path in related infrastructure being directed to the first access node for the first network address.

Routing in said infrastructure is altered when the first mobile node receives service from a second access node, such that at least a second routing path in the infrastructure is directed to the second access node for the first network address, the second routing path being defined at least in part by one or more host-specific routing entries. During a period of subsequent inactivity, the one or more host-specific routing entries are removed from the infrastructure such that the mobile node has no current routing path. During the period of inactivity, two separate states are provided for the mobile node: a) a state in which the mobile node retains the first network address; and b) a state in which the first network address may be reallocated to a different mobile node.

11 Claims, 33 Drawing Sheets

U.S. PATENT DOCUMENTS

| | | | |
|---|---|---|---|
| 5,371,738 | A | 12/1994 | Moelard et al. |
| 5,375,140 | A | 12/1994 | Bustamante et al. |
| 5,384,826 | A | 1/1995 | Amitay |
| 5,400,338 | A | 3/1995 | Flammer |
| 5,528,583 | A | 6/1996 | Acampora et al. |
| 5,533,026 | A | 7/1996 | Ahmadi et al. |
| 5,570,084 | A * | 10/1996 | Ritter et al. ............... 370/338 |
| 5,729,549 | A | 3/1998 | Kostreski et al. |
| 5,751,707 | A | 5/1998 | Voit et al. |
| 5,754,546 | A | 5/1998 | Voit et al. |
| 5,822,324 | A | 10/1998 | Kostreski et al. |
| 5,878,347 | A * | 3/1999 | Joensuu et al. ............. 455/433 |
| 6,002,677 | A | 12/1999 | Javitt et al. |
| 6,038,450 | A | 3/2000 | Brink et al. |
| 6,130,898 | A | 10/2000 | Kostreski et al. |
| 6,246,670 | B1 * | 6/2001 | Karlsson et al. ............ 370/244 |
| 6,647,001 | B1 * | 11/2003 | Bhagavath et al. ......... 370/331 |
| 6,836,477 | B1 * | 12/2004 | West et al. ................. 370/352 |
| 6,958,988 | B1 * | 10/2005 | Okagawa et al. ........... 370/338 |
| 6,963,582 | B1 * | 11/2005 | Xu ............................. 370/466 |
| 7,035,239 | B2 * | 4/2006 | McCann et al. ............ 370/335 |
| 7,088,694 | B1 * | 8/2006 | Rune ......................... 370/331 |
| 7,151,758 | B2 * | 12/2006 | Kumaki et al. ............. 370/331 |
| 2001/0038626 | A1 * | 11/2001 | Dynarski et al. ........... 370/356 |
| 2002/0031107 | A1 * | 3/2002 | Li et al. ..................... 370/338 |

FOREIGN PATENT DOCUMENTS

| | | |
|---|---|---|
| AU | 5424696 | 10/1996 |
| EP | 0 660 632 | 6/1995 |
| EP | 0 737 019 | 10/1996 |
| EP | 0 740 440 | 10/1996 |
| EP | 0 777 396 | 6/1997 |
| EP | 0 829 985 | 3/1998 |
| EP | 0 835 034 | 4/1998 |
| EP | 0 862 344 | 9/1998 |
| EP | 0 883 266 | 12/1998 |
| EP | 0 889 667 | 1/1999 |
| EP | 0 902 551 | 3/1999 |
| EP | 1 011 241 | 6/2000 |
| JP | 10093634 | 4/1998 |
| JP | 11178036 | 7/1999 |
| WO | 96/05704 | 2/1996 |
| WO | 96/28903 | 9/1996 |
| WO | 96/289404 | 9/1996 |
| WO | 98/47302 | 10/1998 |
| WO | 00/44133 | 7/2000 |

OTHER PUBLICATIONS

"IP Micro-Mobility Support Using Hawaii", R. Ramjee, T. La Porta, S. Thuel, K. Varadhan, Feb. 19, 1999, posted on the Internet Engineering Taskforce Internet site at http://www.ietf.org/internet-drafts/draft-rimjee-micro-mobility-hawaii-00.txt.

"A Highly Adaptive Distributed Routing Algorithm for Mobile Wireless Networks" Vincent D. Park and M Scott Corson, Proceedings of INFOCOM '97, Apr. 7-11, Kobe, Japan.

"A Performance Comparison of the Temporally-Ordered Routing Algorithm and Ideal Link-State Routing" Vincent D Park and M Scott Corson, Proceedings of ISCC '98, Jun. 30-Jul. 2, 1999.

"Architectural Considerations for Mobile Mesh Networking", S. Corson et al, May 1996.

Highly Dynamic Destination-Sequenced Distance-Vector Routing (DSDV) for Mobile Computers:, Charles E, Perkins et al., ACM SIGCOMM 1994.

"Providing Continuous Network Access to Mobile Hosts using TCP/IP", Charles Perkins, Computer Networks and ISDN Systems vol. 26 (1993), pp. 357-369.

"Cellular IP—A New Approach to Internet Host Mobility", A.G. Valko, January 199, ACM Comput. Commun. Review.

IP Addressing and Routing in a Local Wireless Network:, Danny Cohen, Jonathan B. Postel, Raphael Rom, IEEE INFOCOM 1992, pp. 626-632.

"Hawaii: A Domain-based Approach for Supporting Mobility in Wide-Area Wireless Networks", R. Ramjee, T. La Porta, S. Thuel, and K. Varadhan, Proceedings of the International Conference on Networking Protocols (ICNP), Nov. 3, 1999, pp. 283-292.

"A protocol for seamless communication in a picocellular network", R. Ghai and S. Singh, May 1994, In Proc. IEEE Supercomm/ICC, pp. 192-196.

"Multicast Communications—Protocols and Applications", Ralph Wittman, Martina Zitterbart, May 12, 2000, Morgan Kaufman Publishers, San Diego, pp. 105-121.

"An Effective Spanning Tree Algorithm for a Bridged LAN", N.F. Huang and Y.C. Cheng, Mar. 1992, International Workshop on Advanced Communications and Applications for High Speed Networks (IWACA '92), Munich, Germany, pp. 43-49.

"Edge Mobility Architecture", A. O'Neill, G. Tsirtis, S. Corson, Jul. 2000, posted on http://www.comet.columbia.edu/micomobility/pub/draft-oneill-ema-02.txt.

"A two-phase inter-switch handoff scheme for wireless ATM Networks", K. Salah, E. Drakoponios, Oct. 1998, IEEE ATM 98 Workshop Proceedings, pp. 708-713.

"Adaptive Routing in Burroughs Network Architecture", J. Rosenberg, Aug. 17, 1987, Computer Communications Review, US Association for Computing Machinery, vol. 17, No. 5, pp. 173-184.

"Paging Support for IP mobility using HAWAII", Ramjee, T. La Porta, L. Li, Jun. 25, 1999, posted on the Internet Engineering Taskforce Internet site at http://www.ietf.org/internet-drafts/draft-ietf-mobileip-paging-hawaii-00.txt.

"P-MIP: Minimal Paging Extensions for Mobile IP", X. Zhang, J. Castellanos, A. Campbell, K. Sawada, M. Barry, July 20000, posted on the Internet Engineering Taskforce Internet site at http://www.ietf.org/internet-drafts/draft-zhang-pimp-00.txt.

"Source-Specific Multicast for IP", H. Holbrook, B. Cain, Mar. 9, 2000, posted on the Internet Engineering Taskforce Internet site at http://www.ietf.org/internet-drafts/draft-holbrook-ssm-00.txt.

"Cellular IP", A. Campbell, J. Gomez, C-Y Wan, S, Kim, Z. Turanyi, A. Valko, Dec. 1999, posted on the Internet Engineering Taskforce Internet site at http://www.ietf.org/internet-drafts/draft-ietf-mobileip-cellularip-00.txt.

"Host Specific Routing", Alan O'Neill, Hongyi Li, Nov. 2000, posted on the Internet Engineering Taskforce Internet site at http://www.ietf.org/internet-drafts/draft-oneill-li-hsr-00.txt.

"State Transfer between Access Routes during Handoff", A. O'Neill, G. Tsirtsis, S. Corson, Aug. 2000, posted on the Internet Engineering Taskfroce Internet site at http://www.ietf.org/internet-drafts/draft-oneill-handoff-state-00.txt.

"IPv4 over Mobile IPv6 for Dual Stack nodes", G. Tsirtsis, A. O'Neill, S. Corson, Aug. 2000, posted on the Internet Engineering Taskforce Internet site at http://www.ietf.org/internet-drafts/draft-tsirtsis-v4-over-mipv6-00.txt.

"Generalized IP Handoff", A. O'Neill, G. Tsirtsis, S. Corson, Aug. 2000, posted on the Internet Engineering Taskforce Internet site at http://www.ietf.org/internet-drafts/draft-oneill-craps-handoff-00.txt.

"EMA Enhanced Mobile IPv6/IPv4", O'Neill, G. Tsirtsis, S. Corson, Jul. 2000, posted on the Internet Engineering Taskforce Internet site at http://www.ietf.org/internet-drafts/draft-oneill-ema-mip-00.txt.

"Host Extensions for IP Multicasting", S. Deering, Aug. 1989, Internet Engineering Taskforce Request for Comment (RFC) 1112, posted on the Internet Engineering Taskforce Internet site at http://www.ietf.org/rfc/rfc1112.txt.

"IP Mobility Support", C. Perkins, Oct. 1996, Internet Engineering Taskforce Request for Comment 2002, posted on the Internet Engineering Taskforce Internet site at http://www.ietf.org/rfc/rfc2002.txt.

"On dynamically adapting registration areas to user mobility patterns in PCS networks", G. Varsamopoious, S.K. Gupta, Sep. 1999, In Proc. Int'l Workshop on Collaboration and Mobile Computing (IWCMC'99), Aizu, Japan.

"Mobile user registration in cellular systems with overlapping location areas", D. Gu and S.S. Rappaport, May 1999, Proceedings of the 50th Vehicular Technology Conference, pp. 802-806.

"Extending Mobile IP with adaptive individual paging: a performance analysis", C. Castelluccia, 2000, In Proc. IEEE Symposium on Computer and Communications, pp. 113-118.

"A hierarchial multiresolution registration structure for mobility tracking", L. Tassiulas, F. Anjum, Sep. 1996, Proceedings of the 5th International Conference on Universal Personal Communications, Boston, MA.

"Distributed algorithms for generating loop-free routes in networks with frequently changing topology", E. Gafni, D. Bertsekas, Jan. 1981, IEEE Transactions on Communications, vol. 29 No. 1, pp. 11-18.

"Location tracking mechanisms for optimal mobility adaption", L. Tassiulas and F.M. Anjum, Oct. 1996, 34th Annual Allerton Conf. On Communications, Control and Computing, pp. 855-864.

* cited by examiner

Fig.26.

| HOST IP ADDRESS (OR PREFIX) | OWN HEIGHT | NEIGHBOUR I.D. | NEIGHBOUR HEIGHT | LINK ID | LINK STATE |
|---|---|---|---|---|---|
| IP1 | $H_i(IP1)$ | w | $HN_{iw}(IP1)$ | L1 | U |
| | | x | $HN_{ix}(IP1)$ | L2 | D |
| | | y | $HN_{iy}(IP1)$ | L3 | D |
| | | z | $HN_{iz}(IP1)$ | L4 | - |
| IP2 | $H_i(IP2)$ | w | $HN_{iw}(IP2)$ | L1 | D |
| | | x | $HN_{ix}(IP2)$ | L2 | U |
| | | y | $HN_{iy}(IP2)$ | L3 | U |
| | | z | $HN_{iz}(IP2)$ | L4 | - |
| ⋮ | ⋮ | ⋮ | ⋮ | ⋮ | ⋮ |

Fig.27.

| HOST IP ADDRESS (OR PREFIX) | LINK ID |
|---|---|
| IP1 | L2 |
| IP2 | L1 |
| ⋮ | ⋮ |

TELECOMMUNICATIONS ROUTING

RELATED APPLICATIONS

This application is related to the following co-pending commonly assigned applications:

| Ser. No. | Filed | Title | Inventors |
|---|---|---|---|
| 10/018,485 | Dec. 19, 2001 | Telecommunications Routing | O'Neill & Corson |
| 10/018,486 | Dec. 19, 2001 | Telecommunications Routing | O'Neill & Corson |
| 10/018,488 | Dec. 19, 2001 | Telecommunications Routing | O'Neill & Corson |
| 10/204,213 | Apr. 11, 2003 | Telecommunications Routing | Corson & O'Neill |
| 10/398,235 | Apr. 3, 2003 | Telecommunications Routing | O'Neill & Corson |
| 10/398,240 | Apr. 3, 2003 | Telecommunications Routing | O'Neill & Corson |
| 10/468,236 | Aug. 18, 2003 | Communications Network | Corson & O'Neill |
| 10/468,351 | Aug. 18, 2003 | Communications Network | O'Neill & Corson |

BACKGROUND

1. Technical Field

This application is the US national phase of international application PCT/GB01/04756 filed 26 Oct. 2001 which designated the U.S.

This invention relates to the routing of telecommunications signals, in particular the routing of packet-based communications such as those used in the "Internet" using the so-called "Internet Protocol" (IP). It relates in one embodiment to a method of routing such communications to both fixed and mobile telecommunications mediums, such that similar services can be used in the same way by users on either medium, and to allow system operators to reduce costs by greater commonality of switching and other network-based facilities.

2. Related Art

Present mobile medium systems are arranged such that a mobile user and associated systems collaborate at the interface with the network (typically the radio base station) to enable a mobile node to change from communicating with one base station to communicating with another, and to enable the network to update intelligence points of the new location. In cellular networks, these intelligence points are the Home and Visitor Location Registers (HLR and VLR), whilst in "Mobile IP" these locations are known as the Home and Foreign Agent. In both cases the "Visitor" Location Register or "Foreign" Agent maintains a record only of those users currently co-operating with base stations under their supervision, whilst their "Home" counterparts maintain a permanent record of their associated users, including a record of which VLR or Foreign Agent each one is currently working with. The address on an incoming message identifies the relevant HLR/Home Agent, to which reference is made to identify the appropriate VLR/Foreign Agent for more specific routing details. This allows minor changes in location to be effected within the VLR/Foreign Agent, locally to the user's current location without informing the HLR/Home Agent, which could be some distance away, thereby greatly reducing the signalling overhead.

The additional cost of mobility is the provision of this Home Agent/Foreign Agent interface, and especially with packet systems, the cost of tunnelling (forwarding messages from one address to another), address exhaustion (the inability to re-use an address from which forwarding is taking place) and triangular routing.

In a fixed medium system, IP routing is based on the distribution of IP address blocks or prefixes, with an associated metric or route cost, from potential destinations to potential senders so that they and intermediate routers can determine the best next hop (neighbour router) towards that destination. These routes are pre-computed for all destinations in the network so that senders can immediately send information when generated. Pre-computation of routes, and deployed routing exchange technology, is possible when the sources and destinations have a fixed location, and communication bandwidth is rich enough for exhaustive exchange of routes. As the proportion of roaming increases however, such models break down and a more dynamic routing approach is required.

A proposal referred to as "HAWAII" was published Feb. 19, 1999 as an Internet-draft entitled "IP Micro-Mobility Support Using HAWAII", R. Ramjee, T. La Por, S. Thuel, K. Varadh, posted on the Internet Engineering Taskforce Internet site at HTTP://www.ietf.org/internet-drafts/draft-rimjee-micro-mobility-hawaii-OO.txt. HAWAII uses specialised path set up schemes which install host-based forwarding entries in specific routers when in a routing domain to support intra-domain micro-mobility, and defaults to using "Mobile-IP" for inter-domain micro-mobility. In HAWAII, mobile hosts retain their network address while moving within the domain. The HAWAII architecture relies on a gateway router into a domain, referred to as the domain root router, to which default routes within the domain are directed. Each mobile host is assigned a home domain based on its permanent IP address. The path set up scheme updates a single routing path in a domain so that connectivity to the mobile host is possible both before and after handoff at the wireless link layer. Only routers located along a single routing path between the domain root router and the base station currently serving the mobile host have routing table entries for the mobile host's IP address. The remainder of the routers in the domain route any packets addressed to the mobile host upwards along default routes which rely on the tree-like nature of the routing domain, rooted at the domain root router, to provide an intersection with the downrouting towards the mobile host along the single routing path for which the routers have individual host entries for the mobile host's IP address.

In HAWAII, mobility between domains is supported by "Mobile IP" mechanisms. The home domain root router is designated as the Home Agent, and encapsulated IP packets are forwarded via the Foreign domain root router.

Drawbacks with the HAWAII proposals include the concentration of Mobile IP tunnels in few nodes in the core of the network, the domain root routers, such that failure of any of these nodes may result in large-scale failure of all Mobile IP state and associated sessions handled by the failing node. Furthermore, since all routing from outside the home domain into the home domain, and in the reverse direction, must occur via the home domain root router, failure of the home domain root router may also result in large-scale failure.

A proposal by the present inventors, referred to as "Edge Mobility Architecture" (EMA), provides "Mobile Enhanced Routing" (MER) to allow the movement of IP addresses allocated to a mobile node by altering routing in the infrastructure of a packet switching networks. A proposed type of routing update limits the amount of signalling required to alter a route for an IP address by propagating a unicast update message between a new and an old access router for the mobile node. As the mobile moves between access nodes, the routing paths created become less efficient.

It would be desirable to provide an improved method of, and apparatus for, altering routing in the infrastructure of a packet communications network.

BRIEF SUMMARY

In one aspect of the invention there is provided a method of controlling routing of packets in a packet switched network including an infrastructure of packet switching nodes interconnected by packet transport links, and a plurality of access nodes to which a routing path, defined by routing entries held in packet switching nodes located along said routing path, may be directed in said infrastructure for a given network address, said method comprising:

- allocating a first said network address to a first mobile node being served via a communications link by a first access node, at least a first routing path in said infrastructure being directed to said first access node for said first network address;
- altering routing in said infrastructure when said first mobile node receives service from a second access node, such that at least a second routing path in said infrastructure is directed to said second access node for said first network address, said second routing path being defined at least in part by one or more host-specific routing entries;
- during a period of subsequent inactivity, removing said one or more host-specific routing entries from said infrastructure such that said mobile node has no current routing path in said network; and
- during said period of inactivity, providing two separate states for said mobile node:
  a) a state in which said mobile node retains said first network address; and
  b) a state in which said first network address may be reallocated to a different mobile node.

By providing the two separate states when host-specific routing has been removed, by means of state a) the process of re-establishing host-specific routing can be made relatively efficient, whereas by means of state b) the efficiency of usage of network addresses can be maintained at a relatively high level.

BRIEF DESCRIPTION OF THE DRAWINGS

Further aspects and advantages of the invention will become apparent from embodiments which will now be described, by way of example only, with reference to the accompanying drawings, in which;

FIG. 26 schematically illustrates a routing protocol data table held in a routing node in accordance with an embodiment of the invention;

FIG. 27 illustrates a next-hop forwarding table held in the routing node in accordance with an embodiment of the invention;

DETAILED DESCRIPTION OF EXEMPLARY EMBODIMENTS

Figure 1:
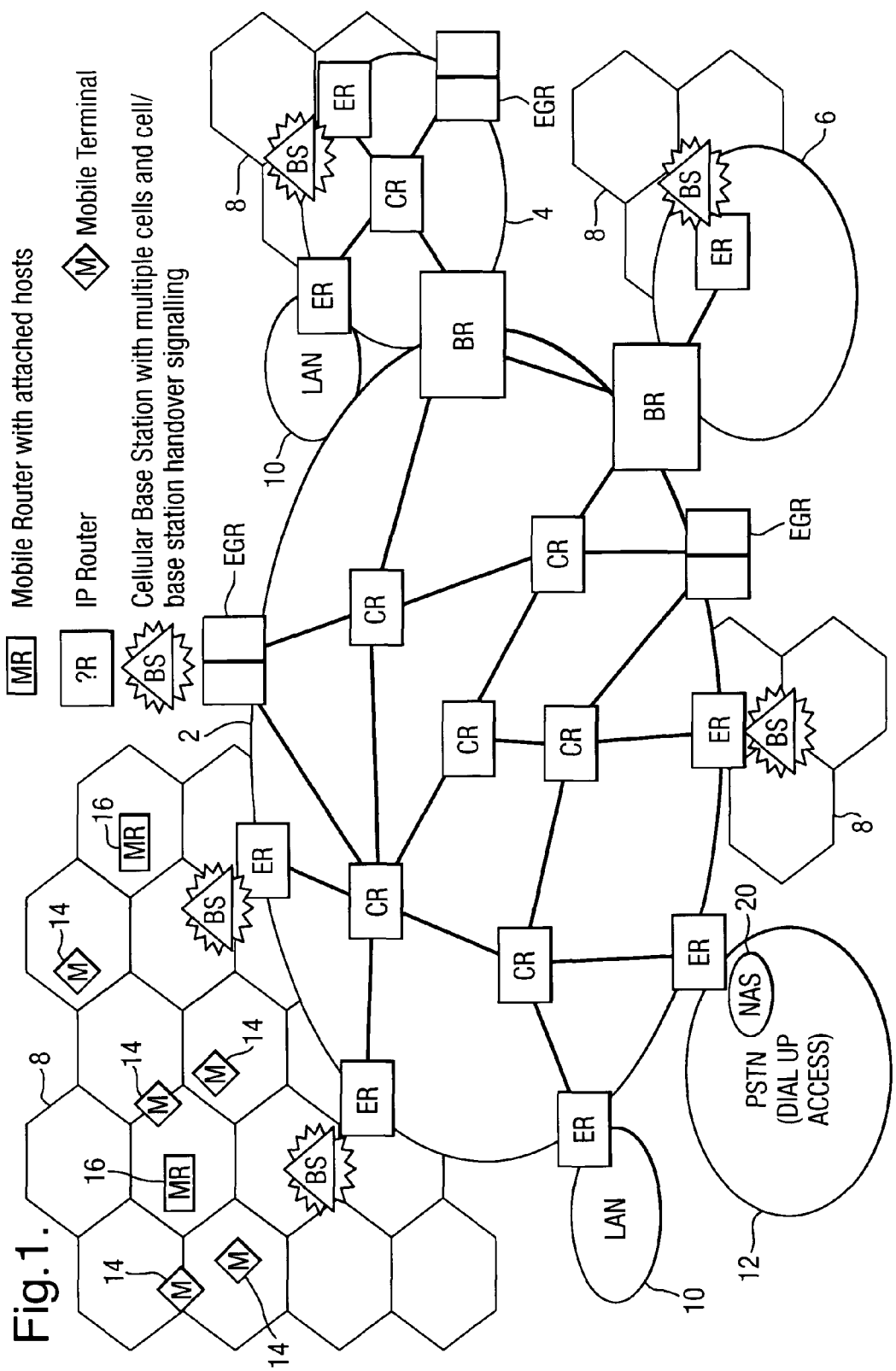
FIG. 1 schematically illustrates an example of a fixed/mobile topology in accordance with an embodiment of the present invention.

Referring now to FIG. 1, an example of a fixed/mobile topology in accordance with an embodiment of the present invention is shown. The topology includes, by way of example, three packet switching networks 2, 4, 6 forming an Autonomous System (AS), the extent of which is schematically indicated by dark shading in FIG. 1. One definition given for the term Autonomous System, is "a set of routers and networks under the same administration" ("Routing in the Internet", Christian Huitema, Prentice-Hall, 1995, page 158). Herein, the term Autonomous System, also referred to as a routing domain in the art, is also intended to mean a network, or a set of networks, having routers running the same routing protocol. An Autonomous System may be connected to other Autonomous Systems forming a global internetwork such as the Internet (used by way of example hereinafter). The routing protocol is an interior gateway protocol, and communications with other Autonomous Systems are achieved via exterior gateway protocols such as the Border Gateway Protocol (BGP). Examples of known interior gateway protocols are the Routing Information Protocol (RIP) and Open Shortest Path First (OSPF).

The networks 2, 4, 6 forming a fixed infrastructure of the Autonomous System include a plurality of Internet Protocol (IP) packet switching nodes in the form of a plurality of Core Routers (CR), a plurality of Edge Routers (ER) and Bridge Routers (BR) interconnecting the different networks 2, 4, 6 in the AS. All of the packet switching nodes in the AS run a single internal IP routing protocol, one embodiment of which is to be described in further detail below.

One or more Exterior Gateway Routers (EGRs) connect the Autonomous System to further Autonomous Systems of the global Internet.

The Autonomous System illustrated in FIG. 1 performs routing for both mobile hosts, for which routing within the AS is altered as a result of mobility of the mobile, and fixed, that is to say stationary, hosts, for which no such routing alterations occur.

Mobile nodes may be connected to the network infrastructure via a wireless link, in the example shown, a cellular radio link (a further possible type of wireless link is an infra-red link), using a base station, forming at least part of an access node for the AS, provided by a network operator. The cellular radio link may be a Time Division Multiplier access (TDMA) system link, such as "GSM", or a Code Division Multiple access (CDMA) system link, such as "CDMA 2000". Mobile nodes take the form of individual mobile hosts 14, and/or mobile routers 16 having a plurality of hosts attached thereto, which respectively conduct radio communication with one or more (e.g. in the case of a CDMA "soft handover") of the access nodes at any given time. An base station may be connected to one or more Base Transceiver Stations (BTSs) which include radio antennae around which individual "cells" of the cellular system are formed.

The mobile nodes 14, 16 move between cells of the cellular radio communications network. If an access node serves a number of cells, a mobile node handed over between cells may continue to receive packet data via the same access node. However, once a mobile node moves outside the range of an access node via which it is receiving service, handing over to a new cell may necessitate a change of routing within the AS. Data packets originating from and destined to the mobile node in question, which are routed, using the identifier of the, or an, IP address of the node, via a given access node prior to handover, may require routing, for the same IP address, via a different access node following handover. A mobile node may be participating in a communications session with a different host via the AS during handover from one access node to another. Because connections at the transport layer (in, for example, a TCP/IP connection) are defined in part by the IP address of the mobile node, such a change in routing is desired to allow such connections to continue using the same IP address when a mobile node receives service from a different access node.

Fixed hosts may be connected to an access node via a Local Area Network (LAN) 10, running a local area network protocol such as an Ethernet protocol. Fixed hosts may also be connected to an access node via a Public Services Telephone Network (PSTN) 12 using a Network access Server (NAS) 20 provided by an Internet access provider. The NAS 20 dynamically allocates fixed IP addresses on a dial-up basis to fixed hosts connecting to the NAS 20 using a protocol such as PPP or SLIP, and routes IP packets originating from, or destined to, each fixed host via an associated access node. Whilst the NAS 20 allocates IP addresses on a dynamic basis, the access node via which packets are routed for the IP address allocated does not change, either during an access session or over a longer-term period. Thus, routing within the Autonomous System does not need to change for each of the fixed hosts other than due to factors internal to the AS such as link failure or traffic management.

The interior gateway protocol, the single IP routing protocol used in the AS in this embodiment of the present invention is a modified version of the Temporally-Ordered Routing Algorithm (TORA) routing protocol, which is described in, inter alia, "A Highly Adaptive Distributed Routing Algorithm for Mobile Wireless Networks" Vincent D Park and M Scott Corson, Proceedings of INFOCOM '97, April 7-11, Kobe, Japan; and "A Performance Comparison of the Temporally-Ordered Routing Algorithm and Ideal Link-State Routing" Vincent D Park and M Scott Corson, Proceedings of ISCC '98, 30 June-2 July, 1999, Athens, Greece.

The TORA routing protocol algorithm executes distributedly, provides loop-free routes, provides multiple routing (to alleviate congestion), establishes routes quickly (so they may be used before the topology changes), and minimises communication overhead by localising algorithmic reaction to topological changes when possible (to conserve available bandwidth and increase scalability).

The algorithm is distributed in that nodes need only maintain information about adjacent nodes (i.e. one hop knowledge). It ensures all routes are loop-free, and typically provides multipath routing for any source/destination pair which requires a route. Since multiple routes are typically established, many topological changes do not require routing updates within the AS as having a single route is sufficient. Following topological changes which do require reaction, the protocol re-establishes valid routes.

The TORA protocol models a network as a graph G=(N, L), where N is a finite set of nodes and L is a set of initially undirected links. Each node i∈N has a unique node identifier (ID), and each link (i, j)∈L allows two-way communication (i.e. nodes connected by a link can communicate with each other in either direction). Each initially undirected link (i, j)∈L may subsequently be assigned one of three states; (1) undirected, (2) directed from node i to node j, or (3) directed from node j to node i. If a link (i, j)∈L is directed from node i to node j, node i is said to be "upstream" from node j while node j is said to be "downstream" from node i. For each node i, the "neighbours" of i, $N_i \in N$, are defined to be the set of nodes j such that (i, j)∈L. Each node i is always aware of its neighbours in the set $N_i$.

A logically separate version of the protocol is run for each destination (identified by e.g. a host IP address) to which routing is required.

The TORA protocol can be separated into three basic functions: creating routes, maintaining routes, and erasing routes. Creating a route from a given node to the destination requires establishment of a sequence of directed links leading from the node to the destination. Creating routes essentially corresponds to assigning directions to links in an undirected network or portion of the network. The method used to accomplish this is a query/reply process which builds a directed acyclic graph (DAG) rooted at the destination (i.e. the destination is the only node with no downstream links). Such a DAG may be referred to as a "destination-oriented" DAG. Maintaining routes involves reacting to topological changes in the network in a manner such that routes to the destination are re-established within a finite time. Upon detection of a network partition, all links (in the portion of the network which has become partitioned from the destination) are marked undirected to erase invalid routes.

The protocol accomplishes these three functions through the use of three distinct control packets: query (QRY), update (UPD), and clear (CLR). QRY packets are used for creating routes, UPD packets are used for both creating and maintaining routes, and CLR packets are used for erasing routes.

At any given time, for each destination, an ordered quintuple, referred to as a "height", $H_i = (\tau_i, oid_i, r_i, \delta_i, i)$ is associated with each node i∈N. Conceptually, the quintuple associated with each node represents the height of the node as defined by two parameters: a reference level and a delta with respect to the reference level. The reference level is represented by the first three values in the quintuple while the delta is represented by the last two values. A new reference level is defined each time a node loses its last downstream link due to a link failure. The first value representing the reference level, $\tau_i$, is a tag set to the "time" of the link failure. The second value, $oid_i$, is the originator-ID (i.e. the unique ID of the node which defined the new reference level). This ensures that the reference levels can be totally ordered lexicographically. The third value, $r_i$, is a single bit used to divide each of the unique reference levels into two unique sublevels. This bit is used to distinguish between the original reference level and its corresponding, higher reflected reference level. The first value representing the delta, $\delta_i$, is an integer used to order nodes with respect to a common reference level. This value is instrumental in the propagation of a reference level. Finally, the second value representing the delta i, is the unique ID of the node itself. This ensures that nodes with a common reference level and equal values of $\delta_i$ (and in fact all nodes) can be totally ordered lexicographically at all times.

Each node i maintains its height, $H_i$. Initially the height of each node in the network (other than the destination) is set to NULL, $H_i$=(-, -, -, -, i). Subsequently, the height of each node i can be modified in accordance with the rules of the protocol. In addition to its own height, each node i maintains, in a routing protocol data table, entries against host IP addresses having an existing DAG in the network, the entries including a height array with an entry $HN_{ij}$, for each neighbour $j \in N_i$.

Each node i (other than the destination) also maintains, in the routing protocol data table, a link-state array with an entry $LS_{ij}$ for each link $(i, j) \in L$. The state of the links is determined by the heights $H_i$ and $HN_{ij}$ and is directed from the higher node to the lower node. If a neighbour j is higher than node i, the link is marked upstream. If a neighbour j is lower than node i, the link is marked downstream.

The TORA protocol was originally designed for use in a Mobile Ad-Hoc Network (MANET) in which the routers are mobile and are interlinked via wireless links. However, in this embodiment of the invention a modified TORA protocol is used in an Autonomous System including a fixed infrastructure of fixed routers interconnected by fixed links, such as that illustrated in FIG. 1, to provide for routing alterations in the Autonomous System when a mobile host alters its point of attachment to the Autonomous System, i.e. the access node.

FIG. 26 illustrates schematically an example of a routing protocol data table which may be held in a packet switching node in accordance with this embodiment.

Against each host IP address (or address prefix in the case of an aggregated DAG, to be described in further detail below) IP1, IP2, etc in the network is stored the height of the storing node $H_i(IP1)$, $H_i(IP2)$, etc. Also, the identity of each adjacent neighbour for example w, x, y, z and that neighbour's height $HN_{iw}(IP1, IP2, etc)$, $HN_{ix}(IP1, IP2, etc)$, $HN_{iy}(IP1, IP2, etc)$ and $HN_{iz}(IP1, IP2, etc)$. Finally, the link-state array for each IP address (or prefix) may be stored in the form of markings signifying an upstream link (U), a downstream link (D), or an undirected link (–) against each link identity (L1, L2, L3, L4) corresponding to each neighbour.

The link-state array held in the routing protocol data table allows a next-hop forwarding decision to be made locally in the router holding the data. For a sufficiently interconnected network, each router should have at least one downstream link. If only one downstream link exists, that link is selected as the next-hop forwarding link. If more than one downstream link exists, an optimum downstream link may be selected, for example on the basis of current traffic loading on the two links. In any case, the selected link is entered into a next-hop forwarding data table against the IP address. A next-hop forwarding table, such as that illustrated in FIG. 27, is held in cache memory for fast access as IP packets requiring routing arrive at the router. The table stores the next-hop forwarding link (L2, L1, etc) selected, against each IP address (or prefix) IP1, IP2, etc.

The use of a fixed infrastructure of routers, and other aspects of the invention to be described below, allow for routing aggregation within the AS, in particular for the IP addresses of mobile hosts. What follows is a brief description of IP addressing, in particular how variable length prefixes are used to provide routing aggregation in an IP routing network.

IP addresses currently consist of a predetermined number (32) of bits. IP addresses were in the past allocated on an unstructured basis (referred to as a "flat" addressing plan). Classful addressing introduced the concept of a two level routing hierarchy by splitting addresses into network prefix and host fields. Users were allocated IP addresses as either a class A, class B or class C to simplify routing and administration.

In class A, bit 0 identifies class A, bits 1-7 identify network (126 networks) and bits 8-31 identify host (16 million hosts).

In class B, bits 0-1 identify class B, bits 2-15 identify network (16,382 networks) and bits 16-31 identify host (64,000 hosts).

In class C bits 0-2 identify class C, bits 3-23 identify network (2,097,152 networks) and bits 24-31 identify host (256 hosts).

A two-level hierarchy still left a flat routing hierarchy between hosts within a network. For example, a class A address block could have 16 million hosts which would result in all routers within the network containing 16 million routing table entries. Subnetting was developed to allow a host address block to be split into a variable length subnet field and host field. This allows routers within an AS to keep routing table entries for subnets only (providing the aggregation of routing for all the hosts on each subnet). A subnet mask is used to enable routers to identify the subnet part of the address.

In accordance with this embodiment of the invention, routing aggregation is provided by assigning a host IP address block (i.e. a contiguous sequence of IP addresses sharing one or more prefixes) to an access node such as an access node, referred to herein as the allocating access node for all IP addresses from within the block. IP addresses from within the block may be allocated to mobile hosts dynamically, i.e. for the duration of their access sessions, or over longer periods, i.e. without reallocation between access sessions. When a mobile host is allocated an IP address, in the case of dynamic allocation when it registers with the cellular network on power up, the serving access node caches a binding between the mobile host's wireless link identifier and the allocated IP address. An aggregated routing plan, in this embodiment an aggregated DAG, is pre-computed within the AS before the mobile host is allocated the IP address. When the IP address is deallocated, in the case of dynamic allocation following power down of the mobile host, the IP address is returned to the allocating access node, which may then allocate the IP address to another mobile host. Mobile host IP addresses allocated by an access node will have an aggregated DAG, until at least one of the mobile hosts moves away, in which case the aggregated DAG will remain in place, but a host-specific exception will be created on the routers affected by a mobility-specific routing updating procedure (the update only changes routing for the single mobile which has moved away).

Pre-computation of routes in an AS for address prefixes owned by an access node is achieved by the owning access node injecting an update message, referred to herein as an "optimization" (OPT) packet, for each prefix which floods out across the AS and effectively acts as a prefix announcement as well as building the aggregated DAG. The OPT packet is transmitted by the access node owning the IP address prefix, or prefixes, and controlling the aggregated DAG. The OPT packet propagates to all other nodes in the network (regardless of their current heights (if set)), and (re)sets these heights to the "all-zero" reference level, that is to say the first three values ($\tau_i$, $oid_i$, $r_i$) of the TORA heights are all set to zero. The fourth height value, $\delta_i$, is set to the number of hops taken by the OPT packet since transmission from the access node (this is similar to UPD packet propagation in known TORA source-initiated DAG creation mechanisms). An increment of 1 may be added to represent the hop from the access node to the mobile node. The fifth height value, i, is set to the node ID.

Once an aggregated DAG exists in the AS, each packet switching node in the AS has a next-hop forwarding table entry for the IP address prefix in question. When a packet arrives at a node which requires routing, the node searches its next-hop forwarding table for the longest matching address entry on which to base the next routing decision, which, providing the mobile node using the IP address has not moved away from the owning access node, will be the IP address prefix. By providing for aggregated DAGs within the AS, routing table size and routing processing may be minimised at each packet switching node.

However, when a mobile node is handed over at the wireless link layer away from the access node at which it first received service in the network, an individual host address entry is created in both the routing protocol data table and the next-hop forwarding table in (a limited number of) packet switching nodes affected by routing updates caused by the mobility of the mobile node. These nodes continue to store the corresponding aggregated address entries, but use the host address entry for routing packets to the IP address of the mobile node by virtue of a longest match search.

The TORA height maintenance algorithm falls into the same general class of algorithms originally defined in "Distributed Algorithms for Generating Loop-Free Routes in Networks with Frequently Changing Topology", E Gafni and D Bertsekas, IEEE Trans. Commun., January 1991. Within this class, a node may only "increase" its height; it may never decrease its height. However, in this embodiment of the invention, an algorithmic modification is provided to ensure that, after an inter-access node handover, a node's forwarding behaviour is such that, when a plurality of routing interfaces to neighbouring nodes exist, it forwards packets over a routing interface to a neighbouring node from which a mobility-related routing update was most recently received. The $\tau$ time value in the height quintuple ($\tau_i$, $oid_i$, $r_i$, $\delta_i$, i) stored in the router's routing protocol data table as an entry against the mobile node's IP address and the neighbour in question is permitted to become "negative", i.e. less than zero, to indicate a mobility-related update having occurred, and the magnitude of the negative $\tau$ time value increases for each occurrence of a mobility-related routing update for a given IP address. Thus, the most recent mobility-related update is indicated by the greater negative $\tau$ time value. It is to be noted, that whilst mobility-related routing updates are distinguished by a negative $\tau$ time value, other indicators may also be used, such as a one-bit flag, to replace the negative flag.

When a mobile node changes access node affiliation, it decreases its height value by decreasing the $\tau$ time value, for example by an integer, and the new value is propagated to a limited number of nodes in the AS as part of a mobile-initiated update of the DAG associated with the mobile node's IP address, to be described in further detail below. A node having multiple downstream neighbours routes onto the most recently-activated downstream link. The heights are still totally-ordered (hence routing loop freedom is preserved).

A further aspect of this embodiment of the invention is that, during a handover of a mobile node at the wireless link layer, a temporary, short term, tunnelling mechanism is provided whereby data packets arriving at the access node from which the mobile node is being handed over may be forwarded to the access node to which the mobile node is being handed over. Tunnelling in an IP packet switching network may be achieved by encapsulation of the data packet with a new IP header (addressed to the IP address of the new access node), referred to as "IP-in-IP tunnelling". At the new access node, the packet is decapsulated and forwarded to the mobile node via the wireless link. Tunnel setup, signalling and authentication mechanisms may be those used in "Mobile IP", as described in, inter alia, "IP Mobility Support", C Perkins, ed., 1ETF RFC 2002, October 1996. With all access nodes enabled with "Mobile IP", "Mobile IP" may also be used to allow packet forwarding to mobile nodes moving to a different AS. Other possible tunnelling protocols include UDP tunnelling (in which a UDP header is added to incoming packets), GRE tunnelling (a CISCO (TM) protocol), the Layer 2 Tunnelling Protocol (L2TP), and negotiated or configured IPSEC tunnel modes.

When a mobile node is to be handed over from an access node, that access node interacts with the new access node, to which the mobile node is being handed over to, to undertake the following steps:

(a) to prepare a unidirectional tunnel to the new access node, so that packets may be forwarded to the mobile node after the wireless link between the old access node and the mobile node is lost. The tunnel may be prepared by a mapping to a pre-existing inter-access node tunnel, or a host-specific tunnel, dynamically negotiated via Mobile IP mechanisms.

(b) to handover the mobile node at the wireless link layer.

(c) to inject a routing update for the mobile node's IP address (or addresses, in the case of a mobile router) from the new access node.

(d) to forward data packets destined to the mobile node's IP address and arriving at the old access node though a tunnel link to the new access node.

(e) to update the invalid routing to the old access node.

(f) to tear down the tunnel, if host specific, or to remove the host-specific state in a pre-existing tunnel, following the convergence of routing.

Prior to handover, all packets are routed directly to the mobile node via a route, or routes, in the infrastructure passing through the old access node. Following the convergence of routing, all packets are routed directly to the mobile node via a route, or routes, in the infrastructure passing through the new access node.

When handover is signalled to the new access node (either from the old access node as part of tunnel establishment, or from the mobile node via a mobile-assisted handover), the new access node generates a directed routing update message which is unicast to the old access node using the existing DAG for the mobile node's IP address (which remains directed to the old access node). This update selectively modifies the mobile's DAG along the reverse lowest-neighbour path (an approximate shortest path) to the old access node. At the end of this update, the old access node will have a new downstream link in the DAG for the mobile node's IP address after the mobile node is handed over at the radio link layer. A crossover router will, during the update process, receive the unicast-directed update at which point an existing data flow is redirected to the mobile node's new access node.

This update procedure is not topologically dependent, and is employed regardless of the topological distance between the new and old access nodes (which can vary substantially depending on the access nodes' relative positions).

The short term tunnel avoids packet loss in the case routing to the new access node is not established by the time the wireless link to the old access node is lost, and if no significant amount of caching is performed at the old access node.

The use of a short-term tunnel may nevertheless not always be necessary, depending on the relative ordering of the two events:
  (i) loss of the access node-to-mobile node wireless link at the old access node and
  (ii) arrival of the directed routing update at the old access node.

If the routing update arrives before the old wireless link is lost, there is no need for the tunnel as no further data packets will arrive at the old access node due to the rerouting (providing control and data packets have equal queuing priority and treatment; if not, then data packets already queued may still arrive after the routing update) and all past data packets will have been forwarded to the mobile over the old wireless link. If no tunnel is required, the premature triggering of a TORA update at the old access node, due to a loss of all downstream links when the old wireless link is lost, may be prevented by marking a virtual downstream link at the old access node until routing converges. Thus, routing hold-down at the old access node may be achieved purely by signalling.

Routing hold-down purely by signalling may also be used where the old access node functions as a cache, for example a transparent cache, allowing the old access node to store relatively large volumes of data until routing converges, and retransmitting the data once routing converges.

As mentioned above, when a mobile node ends its access session, the routing for the mobile node's IP address may be returned to the access node from which it originated, i.e. the IP address's allocating access node. A mechanism is provided to efficiently restore the destination of the DAG to the allocating access node, which requires the participation of only a limited number of nodes in the AS.

When a mobile node ends its access session, the current access node contacts the IP address's allocating access node and initiates the transfer of the destination of the DAG to the allocating access node. Again, a tunnel link can be used as a hold-down mechanism to suppress the initiation of a routing update at the current access node or, more simply, a virtual link (a non-functioning downstream link marking at the current access node) may be used if no data is to be forwarded. The current access node establishes a tunnel link or a virtual downstream link directed to the allocating access node. In response, the allocating access node generates a directed "restore" update which is sent towards the current access node using the existing DAG for the mobile node's IP address (which remains directed to the current access node). This update deletes all the host-specific routing protocol data table entries and next-hop forwarding table entries created by the previous mobility of the mobile node, to restore the pre-computed aggregated DAG as the active routing plan for the mobile node's IP address. The update travels over the path previously created by routing updates caused by the mobile node's past mobility. Thus, the set of negative height values that the mobility-specific updates generated are erased, and the aggregated DAG with its "all-zero" reference level (assuming there have been no failures in the network causing new height generations and reversals) is reactivated. The tunnel link or the virtual link can be maintained until reception of the restore update at the current access node, at which time either the tunnel is torn down or the virtual link is removed.

Periodically, or on detection of a triggering event, the mobile node, or an access node acting on behalf of the mobile node, may re-initialise the DAG for an IP Address, using a TORA update mechanism, with "all-zero" reference levels thereby removing any mobility-related routing table entries for the DAG. "All-zero" reference levels propagated in this manner take precedence over all other height values (both positive and negative) and may propagate throughout the AS (an AS-wide DAG re-optimisation). This provides a mechanism for soft-state route maintenance, which overrides the mobility-related updating mechanism.

A detailed example of inter-BS handover at the wireless link layer and routing updates within the fixed infrastructure of an AS will now be described with reference to FIGS. 2 to 11. A further example is described with reference to FIGS. 12 to 16. A detailed example of the restoration of routing to a allocating access node after the end of a mobile host access session is described in relation to FIGS. 17 to 25. A detailed example of routing updates within the fixed infrastructure of an AS is described with reference to FIGS. 28 to 31. A further such embodiment is described with reference to FIGS. 32 and 33. A host-specific routing data erase procedure is described in relation to FIGS. 34 and 35. A host-specific routing injection procedure in described in relation to FIGS. 36 to 38.

In each of the TORA height quintuples illustrated in FIGS. 2 to 25 and 28 to 38, the node ID is depicted using the reference i, for simplicity. However, it will be appreciated that this value will be different for each node, so as to uniquely identify the node within the AS. It will also be noted that only a part of the AS is illustrated, for the sake of simplicity.

In all of the following examples, the AS includes a plurality of fixed core routers (CR1, CR2 . . . ), a plurality of fixed intermediate routers (IR1, IR2 . . . ) and a plurality of fixed edge routers (ER1, ER2 . . . ), classified in accordance with their relative proximity to the topological "edge" of the fixed infrastructure of the AS. The core routers may be adapted to handle higher quantities of traffic than the intermediate routers, and the intermediate routers, in turn, may be adapted to handle higher quantities of traffic than the edge routers. For example, the core routers may handle national traffic, the intermediate routers regional traffic, and the edge routers sub-regional traffic.

Packet switching routers are combined or associated with wireless base stations to form an embodiment of the entity referred to herein as an access node (BS1, BS2 . . . ), although it should be appreciated that the term "access node" is not intended to be restricted to a routing node including wireless base station functionality. An "access node" may be provided at a node which is topologically distant from a wireless base station, see for example the arrangement described below in relation to FIG. 40.

In the case of all of the examples described below, the hop-by-hop routing directionality at the interfaces is indicated by arrows marked along links between nodes of the network, and between access nodes and mobile nodes (which links include a wireless link). The distributed routing plan is in the form of a TORA DAG directed at a single receiving mobile host, MH2. Before the mobile host MH2 begins an access session, and is dynamically allocated an IP address, a pre-computed and aggregated DAG exists for the IP address within the AS, having been injected as an AS-wide update from the access node allocating the IP address, node BS2. In FIGS. 2 to 25 and 28 to 38, at least those nodes involved in routing updates or packet forwarding are marked with their TORA height quintuple ($\tau_i$, oid$_i$, r$_i$, $\delta_i$, i). As previously described, this TORA height is also stored within the routing protocol data table of each neighbouring node, having been advertised from the node to which the height applies.

When the mobile node MH2 registers with the allocating access node BS2, the allocating access node caches the identity of the mobile host at the wireless link layer against the IP address which is allocated, thus forming a mobile-specific entry in a routing table held in node BS2.

Figure 2:
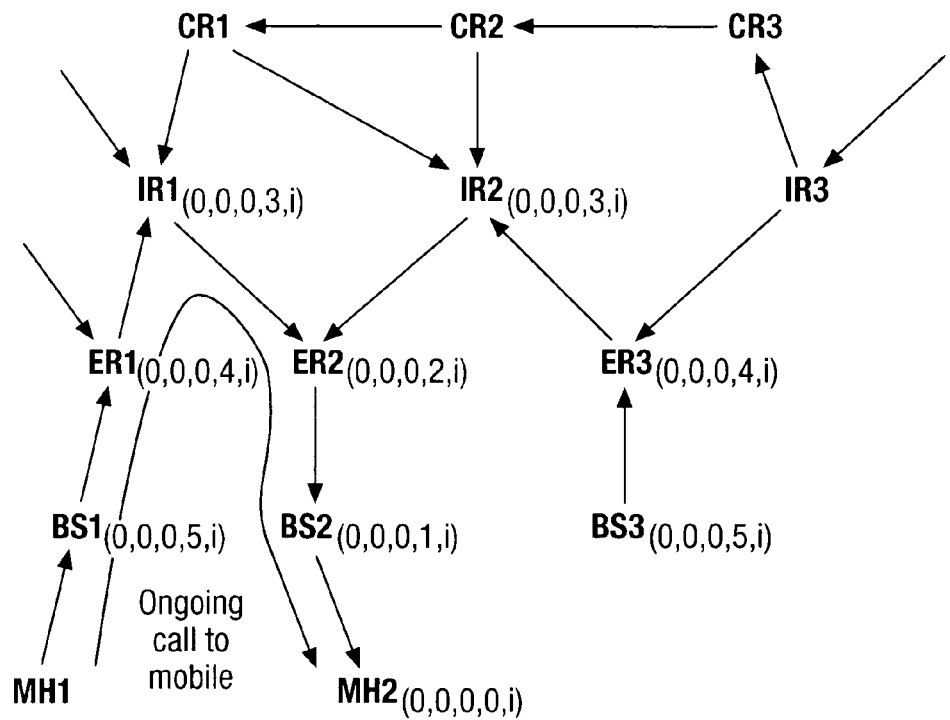
FIGS. 2 to 11 schematically illustrate inter-base station handover and the accompanying routing updates in accordance with an embodiment of the present invention.

FIG. 2 illustrates an exemplary communications session (for example, a TCP/IP connection) occurring between the mobile node MH2 and a further host, in this case a mobile host, MH1. In the following examples, mobility of the correspondent mobile host MH1 does not occur, although such mobility is possible using the same functionality which is to be described in relation to the mobility of the node MH2. A similar communications session may also be conducted with a correspondent fixed host. Notably, a separate DAG exists within the AS directed towards the node MH1, whereby data packets originated from the node MH2 are routed to the node MH1. As this DAG directed to the node MH1 does not alter, and routing exists towards the node MH1 from each access node which the node MH2 affiliates with, no further description of routing towards the node MH1 will be provided.

Data packets originated from the node MH1 and destined to the node MH2 are initially routed to the allocating access node BS2 via its aggregated DAG, for example via fixed nodes BS1, ER1, IR1, and ER2, as shown in FIG. 2.

Figure 3:
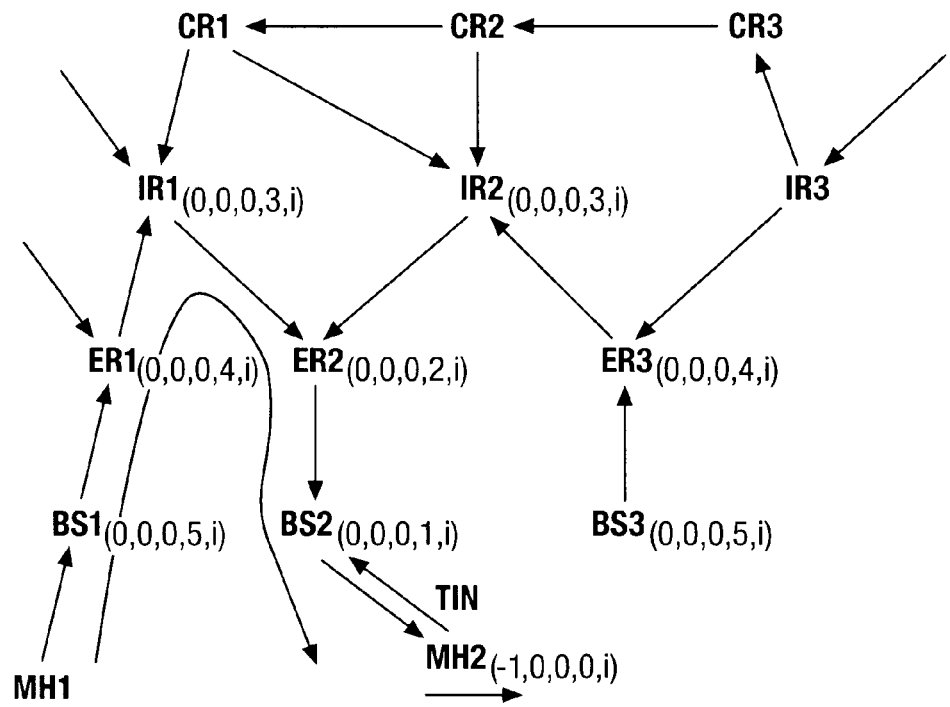

Referring now to FIG. 3, a wireless link layer inter-BS handover decision may be made either by the node MH2 itself, or by the node BS2. In the case of a mobile node-initiated handover, the decision may be made based on a comparison of wireless link quality between signals received from the nodes BS2 and BS3. As the mobile node MH2 moves, the signal received from access node BS3 may improve, whilst the signal received from access node BS2 worsens, and at a threshold decision event, the mobile host responds by initiating a handover between nodes BS2 and BS3. In the case of a handover decision made at node BS2, the decision may be made based on other considerations, such as traffic load. In such a case, the access node BS2 transmits a handover instruction to node MH2.

Whether the inter-BS handover is initiated by the mobile node MH2 or the allocating access node BS2, the mobile node MH2 selects a new access node BS3 and transmits a tunnel initiation (TIN) packet to the allocating access node BS2. The TIN packet includes the IP address of the new access node BS3, which the mobile node reads from a beacon channel broadcast by access node BS3. Mobile node MH2 also computes a new height, by decreasing the τ time value of its height to a negative value, −1 (indicating a first mobility-related routing update away from the allocating access node BS2), and includes this in the TIN packet.

Figure 4:
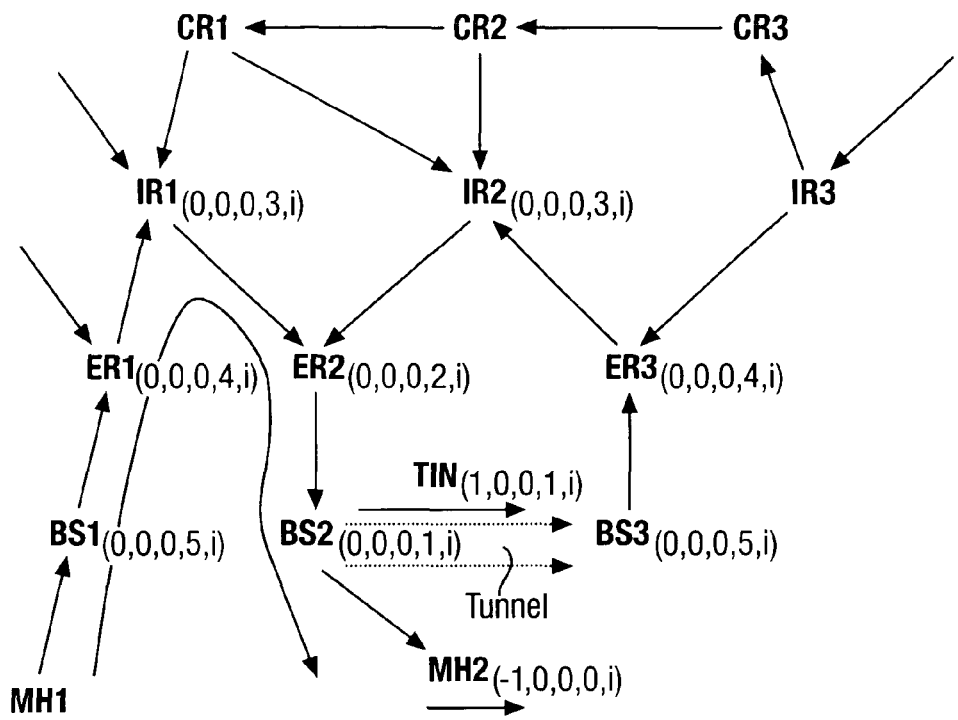
Figure 5:
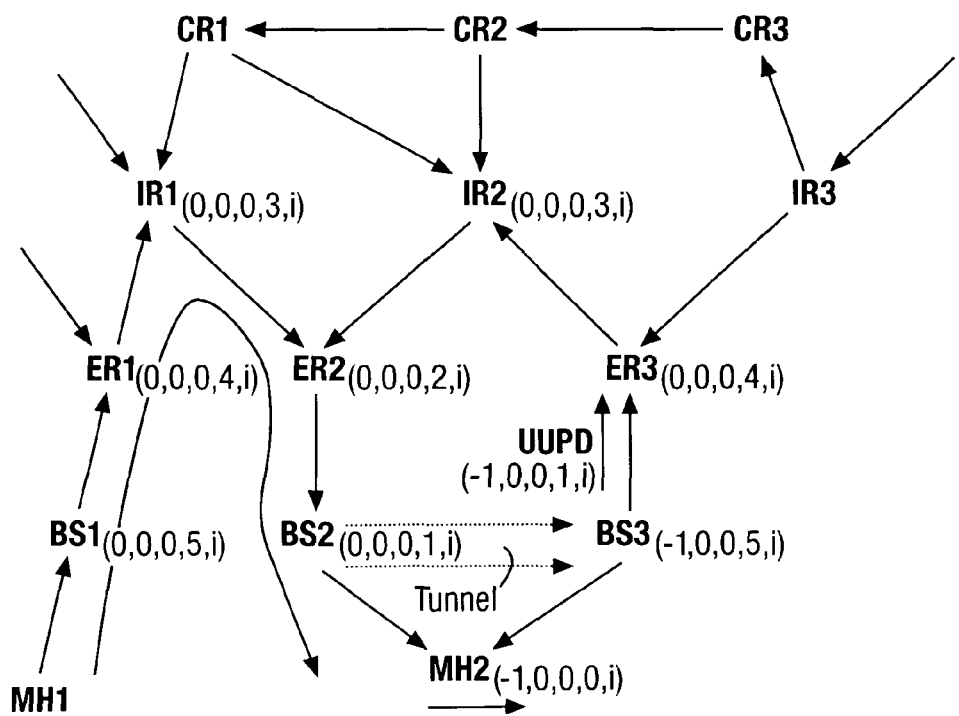

Referring now to FIG. 4, when the allocating access node BS2 receives the TIN packet from mobile node MH2, the allocating access node BS2 establishes a short term IP-in-IP tunnel link towards the new access node BS3. The allocating access node BS2 enters the tunnel interface to BS3 in its routing table, the TORA height of the new access node BS3 being set equal to (−1, 0, 0, 1, i) to ensure the tunnel interface being marked as a downstream link for data packet forwarding during the remainder of the handover procedure.

When the short-term tunnel link has been established from allocating access node BS2 to new access node BS3, the allocating access node BS2 forwards the TIN packet received from mobile node MH2 to the new access node BS3 via the tunnel interface.

In the present embodiment, the nature of the wireless link system used is such that the mobile node MH2 is (as in a CDMA cellular radio system allowing soft handover) able to communicate via two simultaneous wireless links to each access node BS2 and BS3 during a handover. Thus, next, the mobile node MH2 establishes a second wireless link with the new access node BS3, and a routing table entry is made in node BS3 indicating a downstream link towards mobile node MH2.

The new access node BS3 generates a unicast-directed update (UUPD) packet, having as a destination the address of the allocating access node BS2. The address is the prefix of its IP address block, and therefore the UUPD packet follows the aggregated DAG existing in the AS for the allocating access node BS2. The UUPD packet is thus to travel along a unicast path between the new access node BS3 and the allocating access node BS2. Processing of the UUPD packet causes the updating of entries in the routing protocol data tables, and consequently also in at least some of the next-hop forwarding tables, of all nodes along the update path, and all nodes immediately adjacent to the nodes along that path (the nodes along the path transmit an advertisement of their new heights to each immediately neighbouring node, the propagation of the advertisements being limited to one hop).

Figure 6:
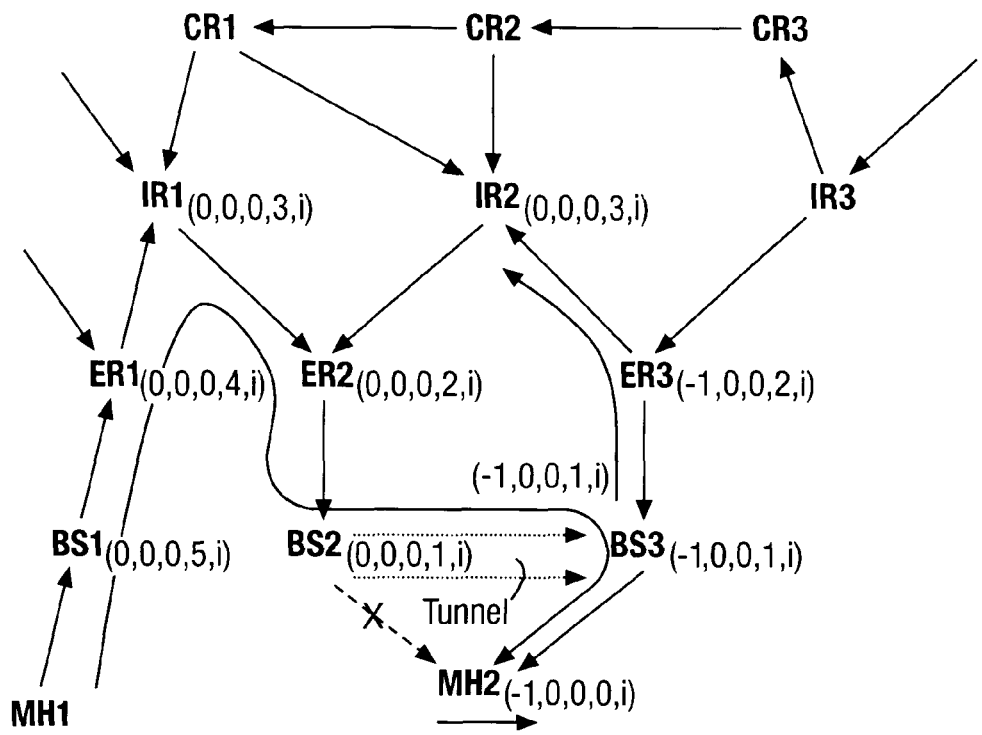

Referring now to FIG. 6, after the mobile host MH2 establishes a new wireless link with the new access node BS3, the old wireless link to the allocating access node BS2 is pulled down. Data packets directed to the mobile node MH2 arriving at the allocating access node BS2 are forwarded to the new access node BS3 via the short-term tunnel, and onward to the mobile node MH2 via the new wireless link.

Although the old wireless link is now lost, no routing update is yet triggered at the allocating access node BS2 (as would otherwise occur according to the TORA protocol), since a remaining downstream link exists along the tunnel which has been established between the allocating access node BS2 and the new access node BS3. Thus, routing towards the allocating access node BS2 remains in place until the routing update initiated from the new access node BS3 arrives at the allocating access node BS2. As shown in FIG. 6, the UUPD packet is forwarded from the first node ER3 receiving the UUPD packet, which also updates its height with the negative δ time value associated with the mobility update (−1), to node IR2. Node IR2, in turn, updates its height with the negative δ time value associated with the mobility-related update.

Each node along the routing update unicast route also increments its δ value in the TORA height quintuple by one for each hop of the routing update UUPD packet, so that the δ value represents the number of hops to the mobile node via the new access node BS3, in place of the δ values of the previous routing table entry which indicated the number of hops to the mobile node via the allocating access node BS2. Each link in turn along the unicast directed update route is thus directed towards the new access node BS3.

Figure 7:
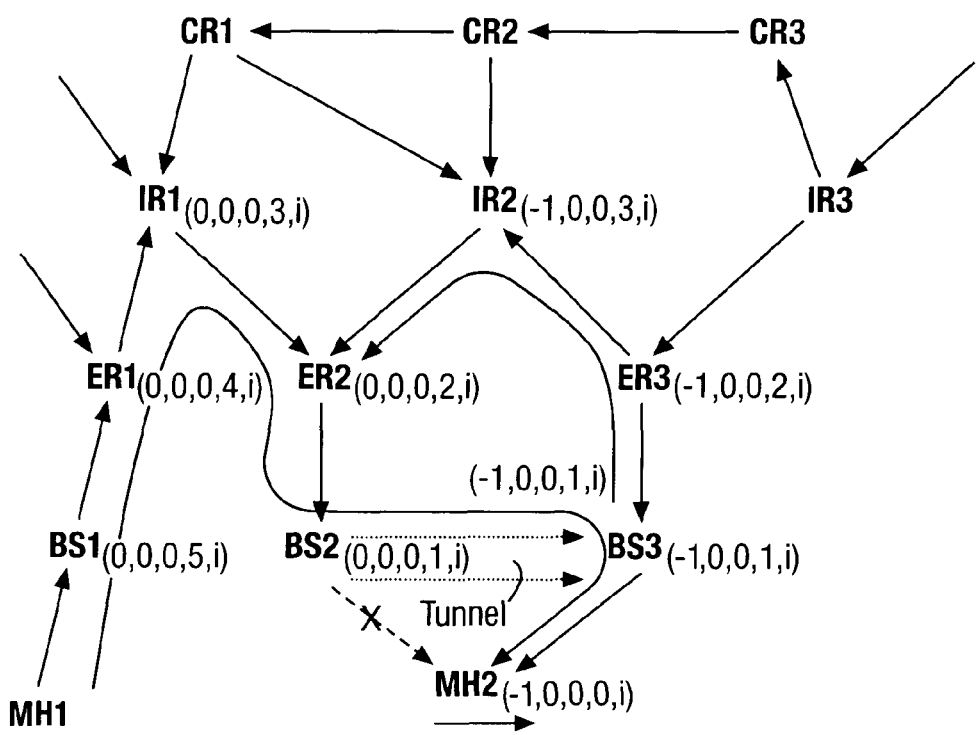
Figure 8:
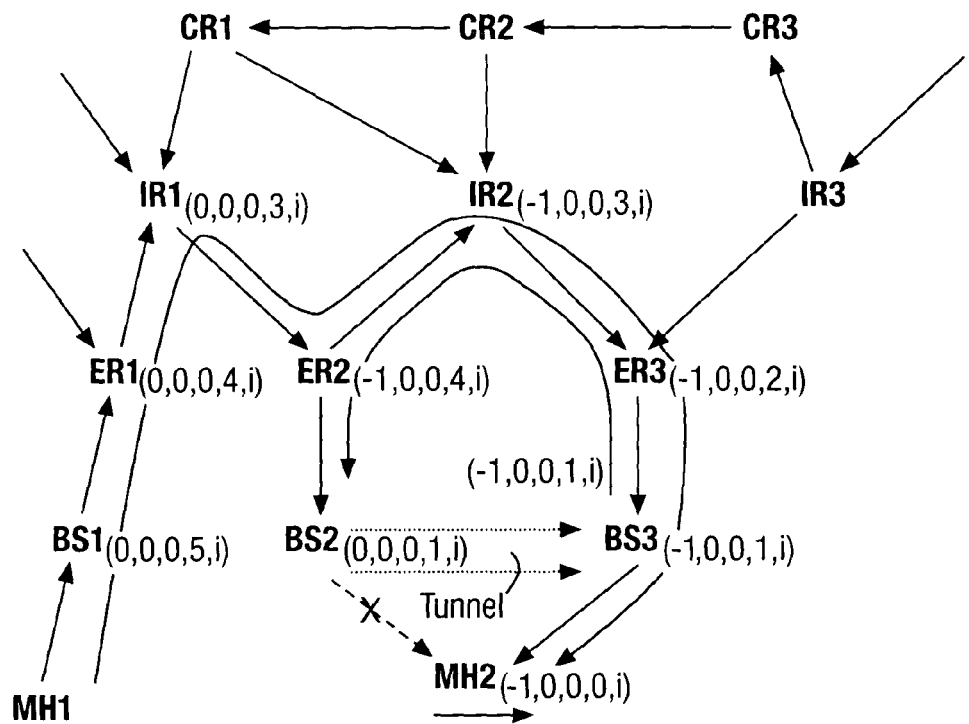

Referring now to FIG. 7, the UUPD packet is next forwarded to the subsequent node along the unicast updating route, node ER2. Node ER2 is a router which marks the cross-over point between the routing path followed from the transmitting node MH1 to the allocating access node BS2 and the routing path to be followed by packets transmitted from the node MH1 to the new access node BS3 (the routing path being established). As shown in FIG. 8, once the routing protocol data table entries in node ER2 are updated on receipt of the UUPD packets, the cross-over node ER2 has two downstream links, one directed towards the allocating access node BS2 and one directed towards the new access node BS3. However, because the downstream link directed towards the new access node BS3 includes a (most) negative T time value, which indicates a (most-recent) mobility-related update, the downstream link directed towards the new access node BS3 is preferentially selected as the next-hop forwarding link. Data packets arriving at node ER2 directed to the mobile host MH2 are forwarded to node IR2, along the routing path to the new access node BS3. Following the diversion of the routing path at the cross-over router ER2, no further data packets are forwarded to BS2 and no further data packets are forwarded through the tunnel interface between the node BS2 and the node BS3. However, the tunnel interface remains in place for the time being at the allocating access node BS2, in order to ensure that no routing update is generated from allocating access node BS2 (due to loss of all its downstream links) until the UUPD packet arrives at the allocating access node BS2. On arrival of the UUPD packet at the allocating access node BS2, the tunnel state entries in the routing table of BS2 are removed, thereby tearing down the tunnel interface for MH2.

Figure 9:
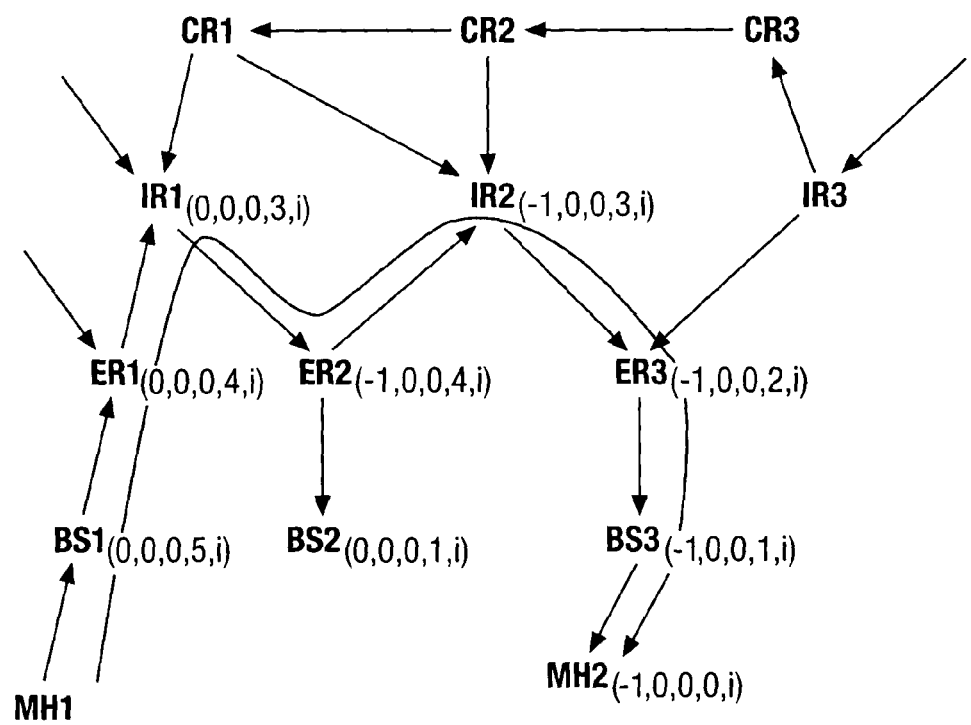

Referring now to FIG. 9, it will be noted that the height of the allocating access node BS2 is not redefined on receipt of the UUPD packet (however, the link direction between the node BS2 and ER2 is reversed because of the negative τ time value defined in the height for node ER2, thus allowing other mobile hosts receiving service via BS2 to transmit packets to MH2), since the allocating access node BS2 forms the end of the unicast update path.

Finally, on receipt of the UUPD message, the allocating access node BS2 may transmit an update-complete acknowledgement (UUPD-Ack) towards the new access node BS3. The UUPD-Ack packet follows the unicast-updated routing path established in the DAG towards new access node BS3. On transmission of the UUPD-Ack packet, old access node BS3 relinquishes tentative control of routing for the IP address it originally allocated to the mobile node MH2. On receipt of the UUPD-Ack packet, the new access node BS3 takes tentative control of routing for the IP address of the mobile node.

The routing update associated with the inter-BS handover of the mobile station at the radio link layer is now complete, involving the redefinition of the height of only a limited number of nodes (In the example shown in FIG. 9, only five nodes) along the unicast update path. Furthermore, the updating of routing protocol data table entries is also limited, such updates only being required in the nodes receiving the UUPD message and each immediately adjacent node (which receive an advertisement of the new heights and store the new heights in their routing tables). In the example shown in FIG. 9, routing protocol data table updates are also performed in each of nodes IR1, CR1, CR2 and CR3.

Figure 10:
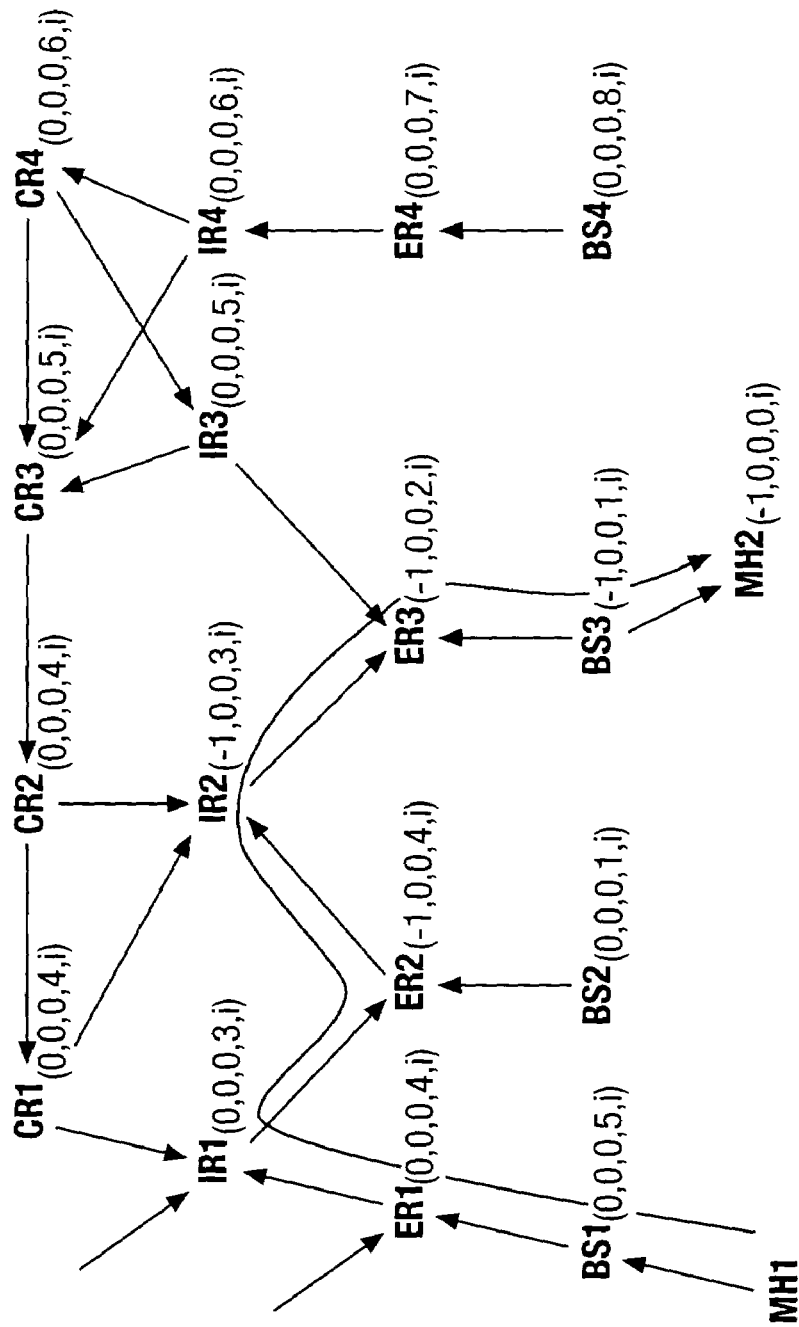
Figure 11:
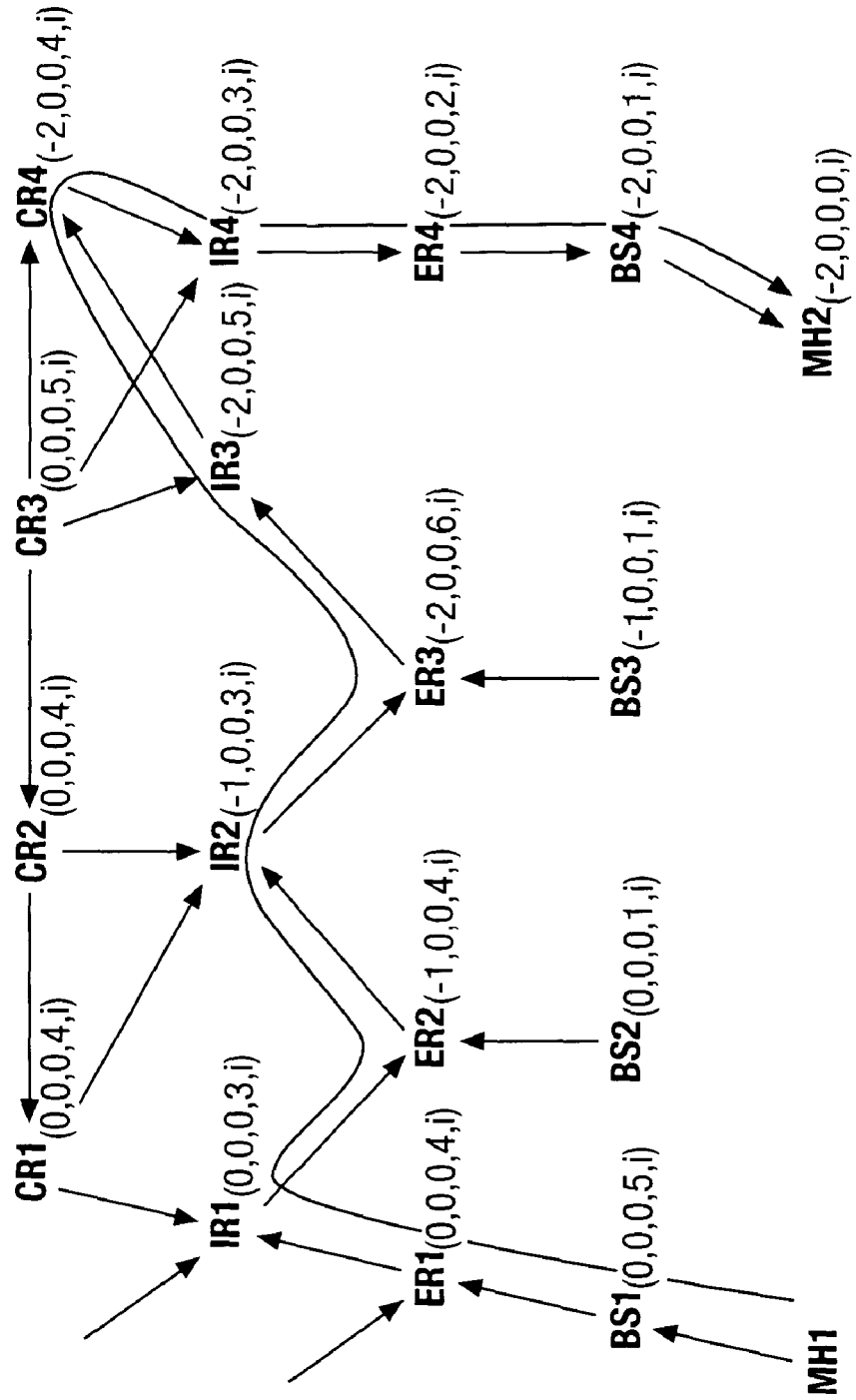

FIGS. 10 and 11 show the state of the host-specific DAG (including the aggregate DAG components at nodes which have not undergone mobility-related height updates) within the AS prior to, and following, a subsequent mobility-related update. In this case, the mobile node MH2 is handed over to a further access node BS4 from the access node BS3, to which the mobile node was previously handed over from access node BS2. The procedure employed is the same as that described in relation to the mobility-related update caused by the first handover of the mobile node from access node BS2 to access node BS3, except that the UUPD packet has the access node BS3 as its destination. Furthermore, the new heights generated by the unicast update sent from the new access node BS4 include a further increment in the negative T time value (which is thus increased in magnitude to −2), to differentiate the mobility-related updated heights caused by the second occurrence of mobility from the mobility-related updated heights of the first occurrence of mobility (having a T time value of −1), and from the mobility-related updated heights from the heights assigned in the aggregated DAG (having a τ time value of 0). As shown in FIG. 1, the nodes involved in the new update initially have heights including a T time value of 0, indicating that the heights are as defined in the aggregated DAG.

Figure 12:
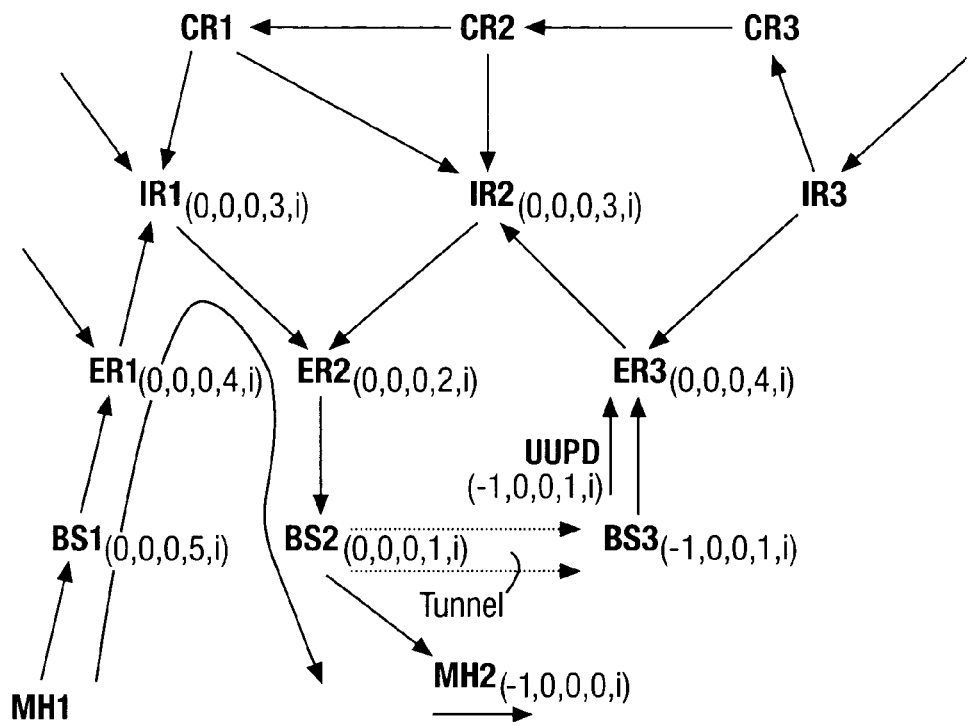
FIGS. 12 to 16 illustrate inter-base station handover and the accompanying routing updates in accordance with a further embodiment of the invention.

A further embodiment of mobility-related routing updating, in which the mobile node is (as in a GSM cellular radio system) capable of communicating only via a single wireless link at any particular time, will now be described with reference to FIGS. 12 to 16. In this case, the steps described in relation to FIGS. 2 to 4 in the previous example are identical. As shown in FIG. 12, the UUPD packet sent from the new access node BS3 is generated in response to receipt of a TIN packet along the tunnel interface.

Figure 13:
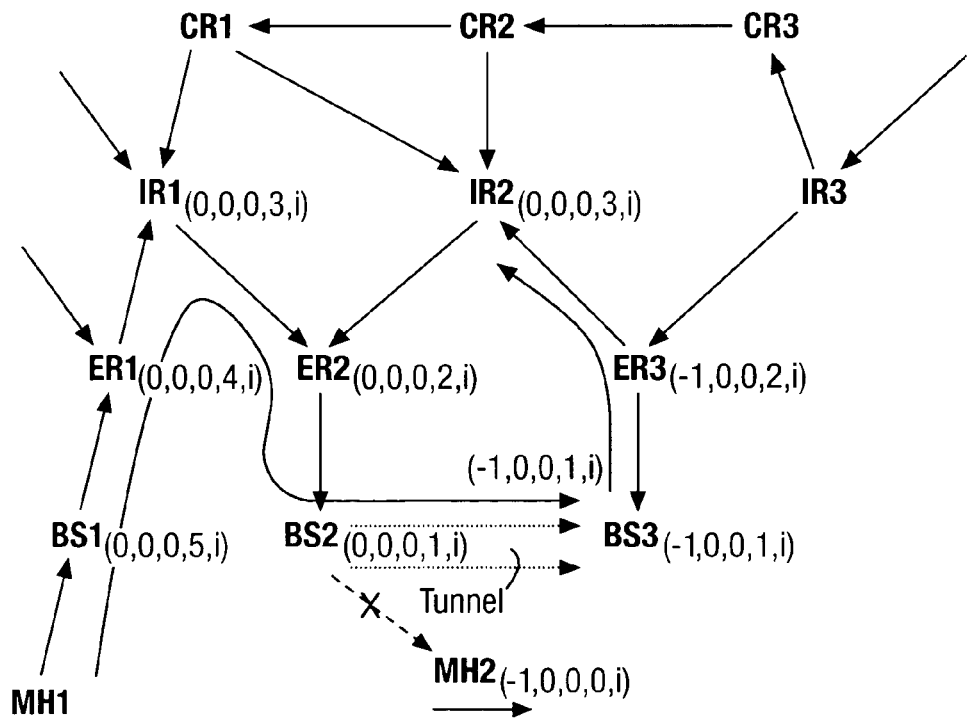
Figure 14:
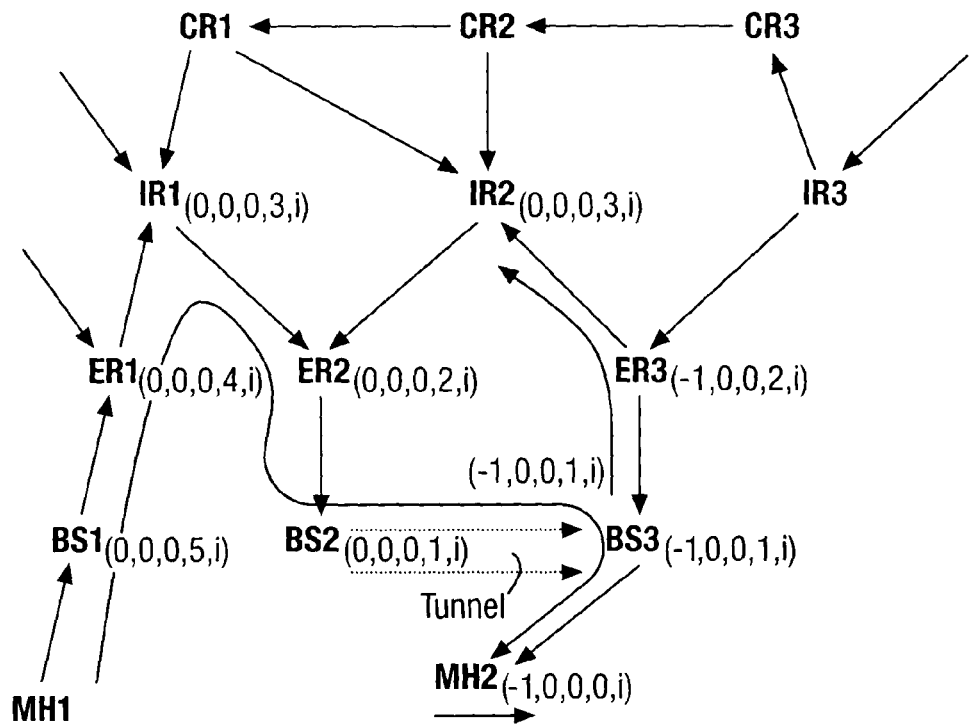
Figure 15:
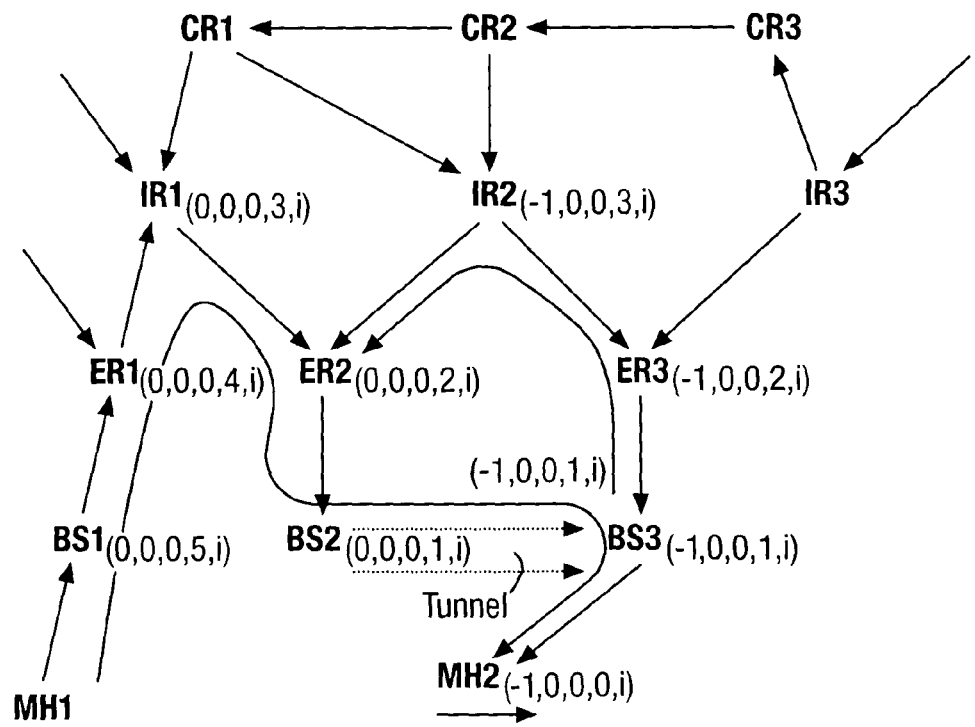
Figure 16:
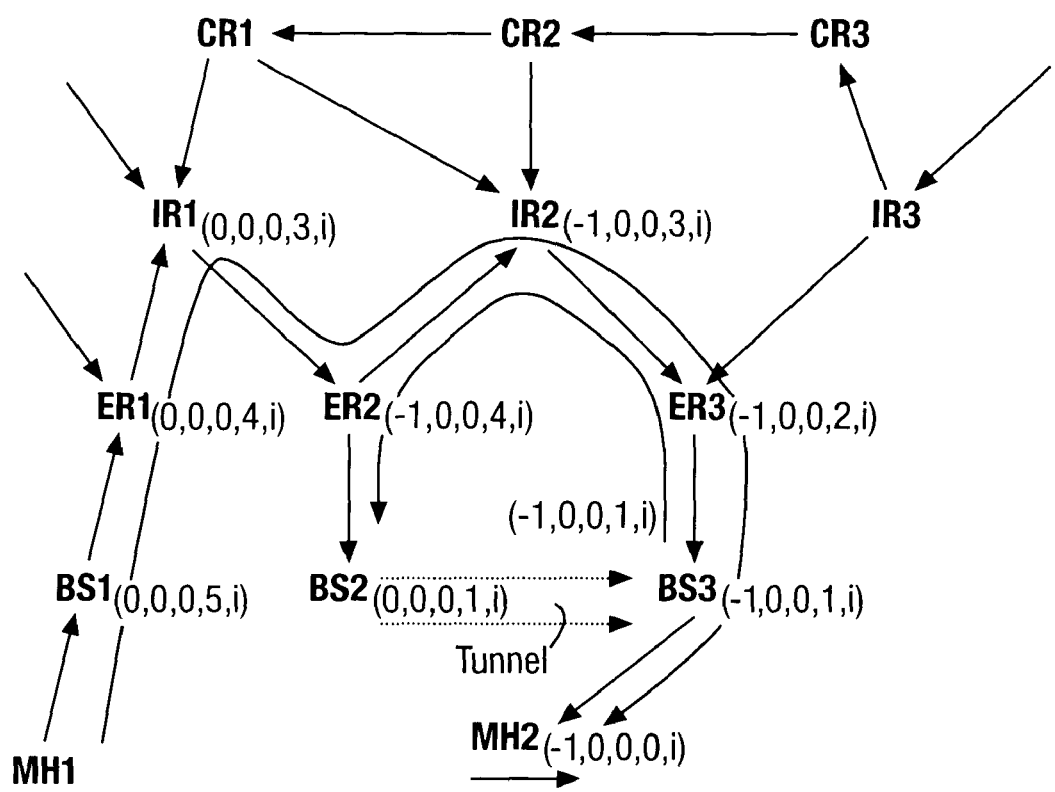

Referring now to FIG. 13, the mobile node MH2 first loses it wireless link with the allocating access node BS2, and a short time period elapses (to allow for re-synchronisation with the new access node BS3 at the wireless link layer, etc.) before the new wireless link with the new access node BS3 may be established. During the period that the mobile node MH2 has no wireless links, data packets arriving at the allocating access node BS2 are forwarded by the tunnel interface from the allocating access node BS2 and are queued at the new access node BS3 until the new wireless link is established. Next, either the new wireless link is established or the UUPD packet arrives at the allocating access node BS2. If the new wireless link is established first, the new access node BS3 immediately assumes tentative control of routing for the IP address of the mobile node. Otherwise, the new access node BS3 waits until it receives the UUPD-Ack message from the allocating access node BS2. Remaining steps described in relation to the previous example (tunnel tear down, subsequent mobility, etc.) also apply in relation to the present example.

FIGS. 17 to 25 illustrate a procedure for use in the case IP addresses are dynamically allocated to mobile nodes. When a mobile node ends an access session, routing updates may be performed which restore the DAG for the IP address of the mobile node to the condition of the DAG before the IP address was originally allocated to the mobile node, that is to say restore the aggregated DAG completely. The routing update procedure involves routing updates being transmitted to only a limited number of nodes in the AS (along the paths along which unicast mobility-related updates were previously performed), and updates are required in the routing protocol data tables of only a limited number of nodes (the nodes along which the restored directed routing update messages pass and each immediately adjacent node).

Figure 17:
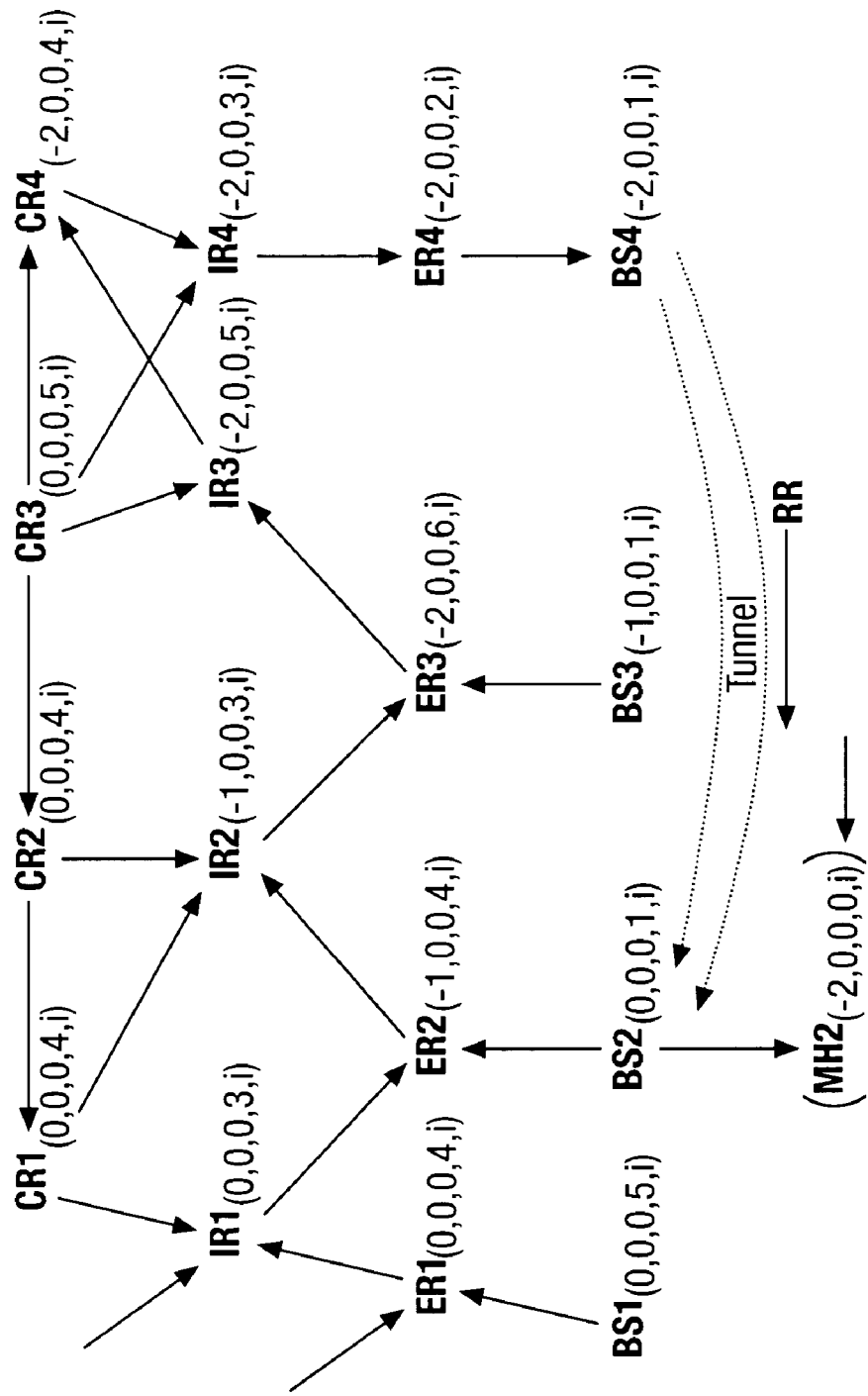
FIGS. 17 to 25 illustrate the restoration of routing to a allocating access node in accordance with an embodiment of the invention.

Referring to FIG. 17, when the mobile node MH2 ends the access session, the current access node BS4 transmits a restore request (RR) packet to the allocating access node BS2 for the IP address. The destination of the RR packet is the IP address of the allocating access node BS2, which is a prefix of the mobile node's IP address.

Thus, the RR packet is to be routed along the aggregated DAG routing path for the mobile node's IP address, which remains directed at the allocating access node throughout the access session.

In response to receipt of the RR packet, allocating access node BS2 marks a downstream link in its routing tables to mobile host MH2. This downstream link is a virtual link, since the mobile host is currently not in wireless communications with any access node and is in fact located in a service area of a different access node (that of access node BS4). Any packet arriving at BS4 for the mobile node MH2 following the end of its access session may be forwarded along the tunnel to the allocating access node BS2, and may be stored for future forwarding to the mobile node MH2 when it begins a new access session.

Figure 18:
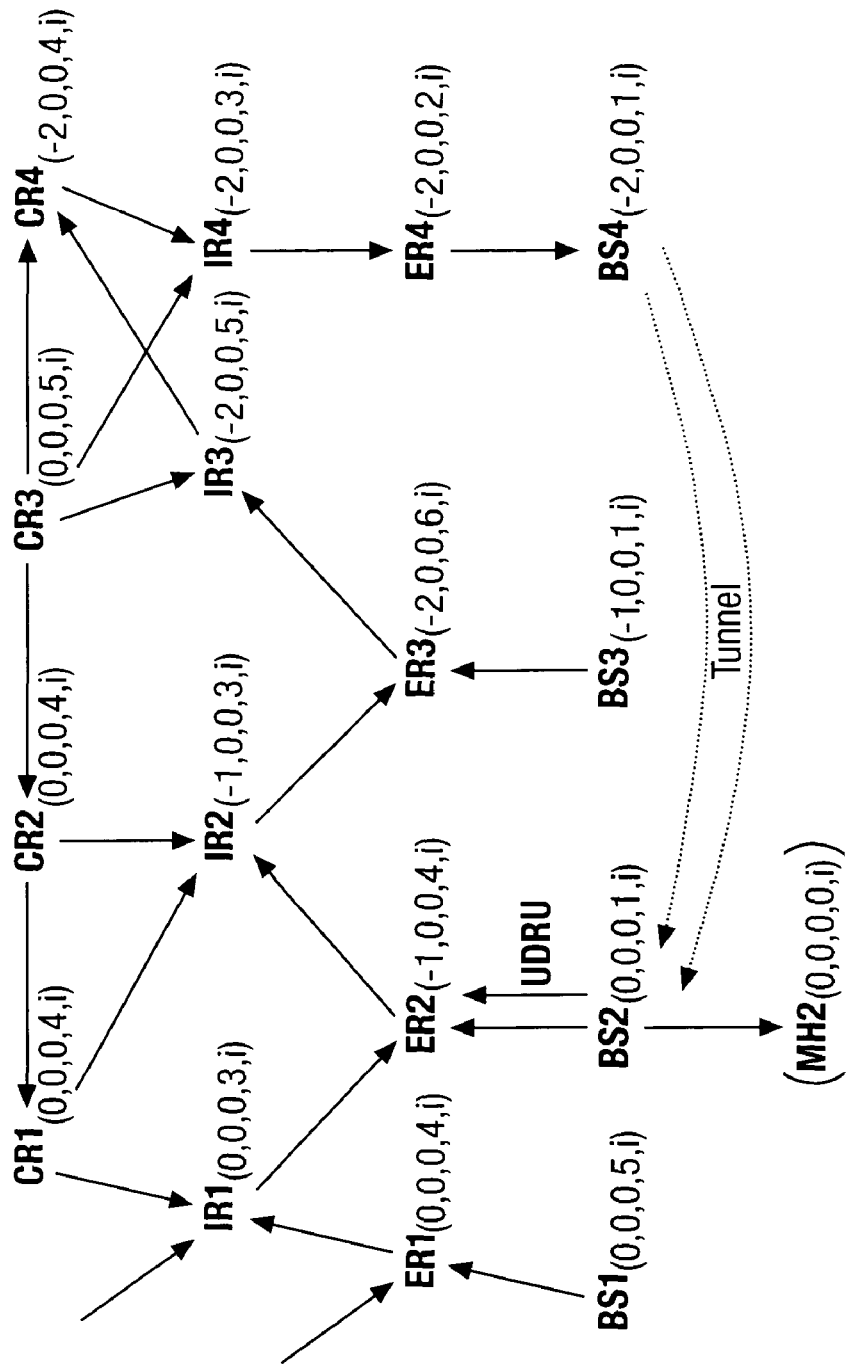
Figure 19:
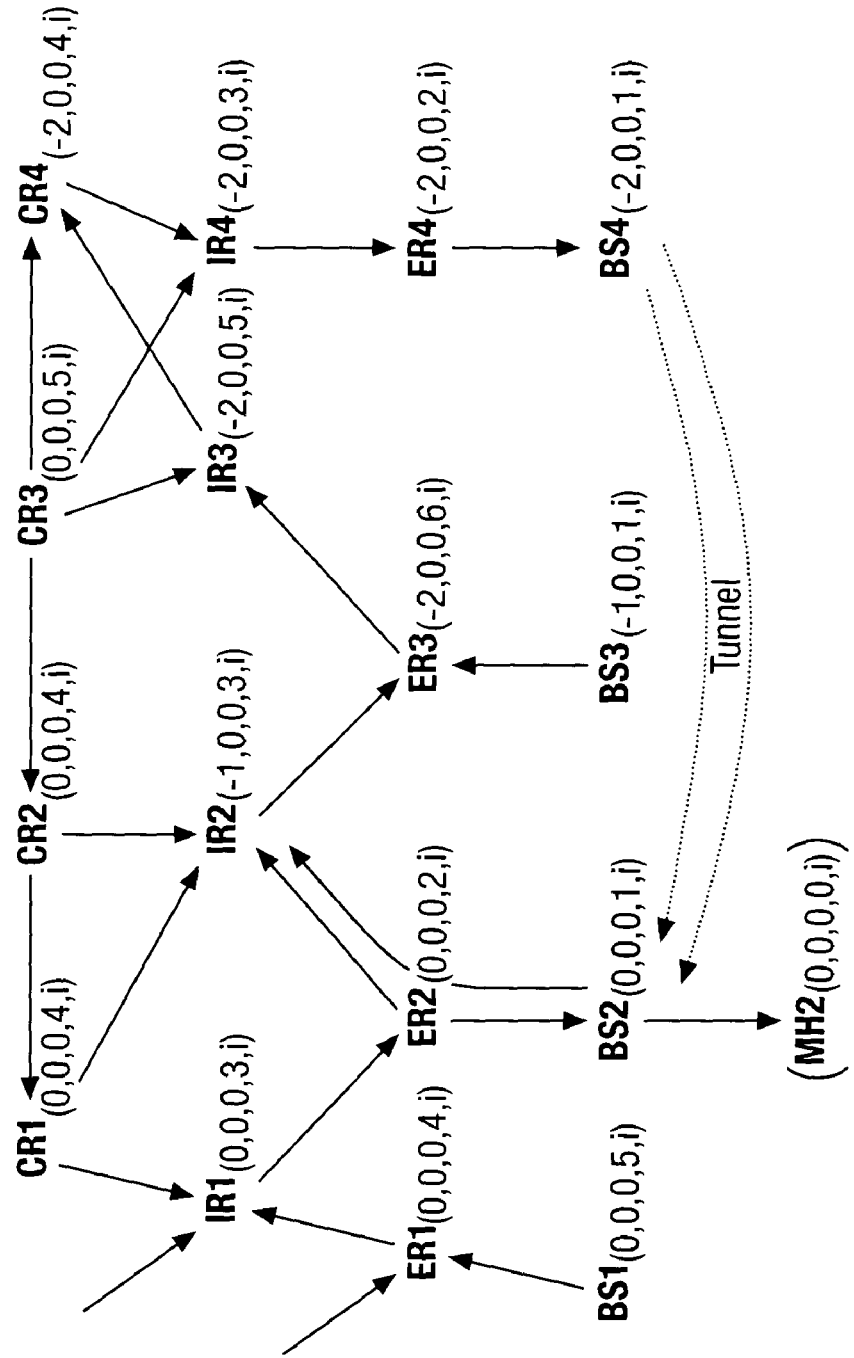

On receipt of the RR packet, the allocating access node BS2 also resets the height of the (now virtual) mobile node MH2 to an "all-zero" reference level, and sends a unicast-directed restore update (UDRU) packets towards the current access node BS4, via the fixed infrastructure of the AS, as illustrated in FIG. 18. The UDRU packet is forwarded along a unicast route, which includes only nodes having heights which were previously redefined as a result of mobility-related updating. In the example shown in FIG. 18, these nodes are nodes ER2, IR2, ER3, IR3, CR4, IR4, ER4 and BS4.

As the UDRU packet is received at each of the nodes along the unicast path, the TORA heights at each node are reset to values existing in the aggregated DAG, an "all-zero" reference level. The $\delta$ values of the heights are redefined so as to represent the number of hops to the (now virtual) mobile node via the allocating access node, in place of the previous entry values which indicated the number of hops to the mobile node via the current access node. This process is illustrated in each of FIGS. 18 to 22.

Figure 20:
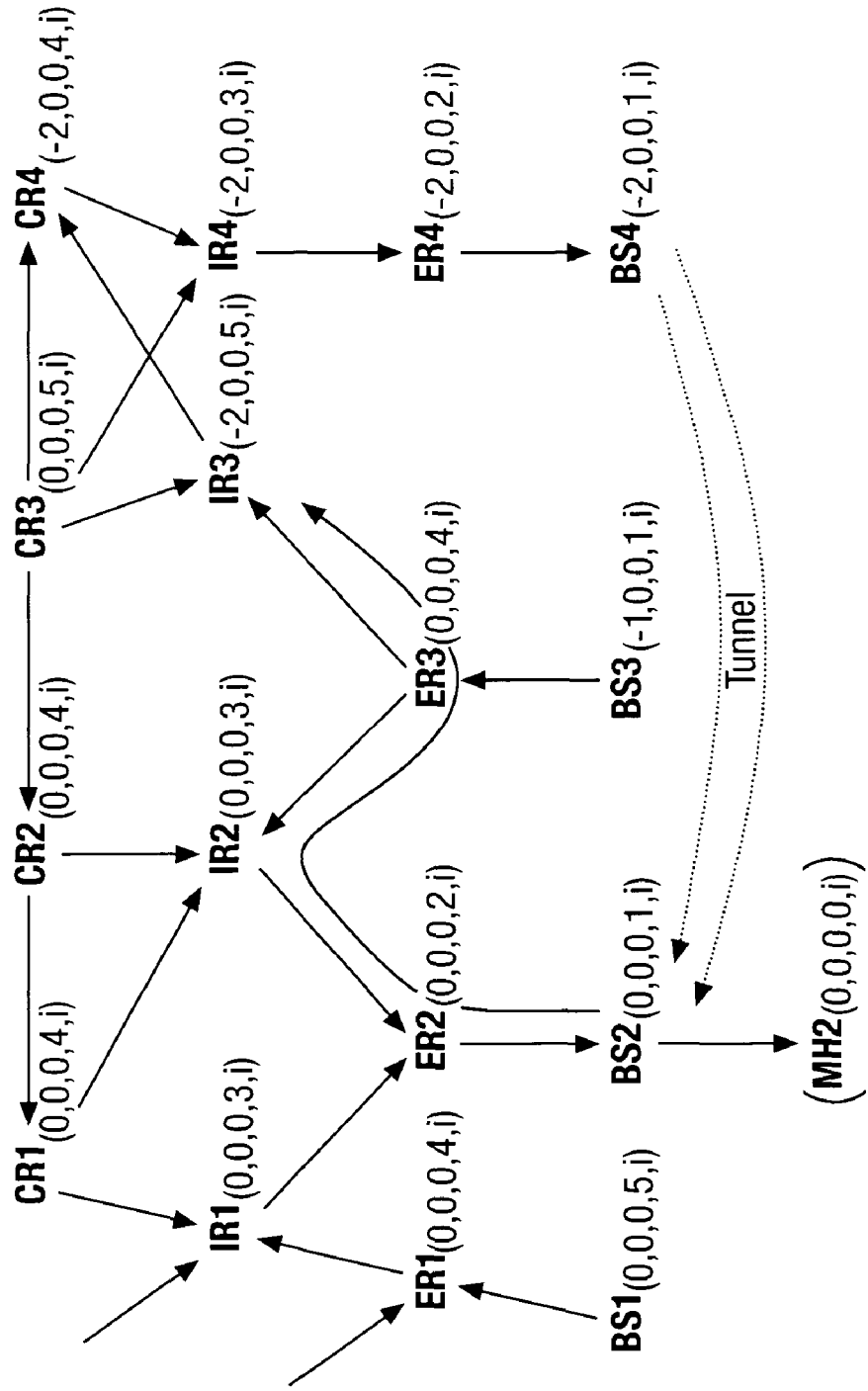
Figure 21:
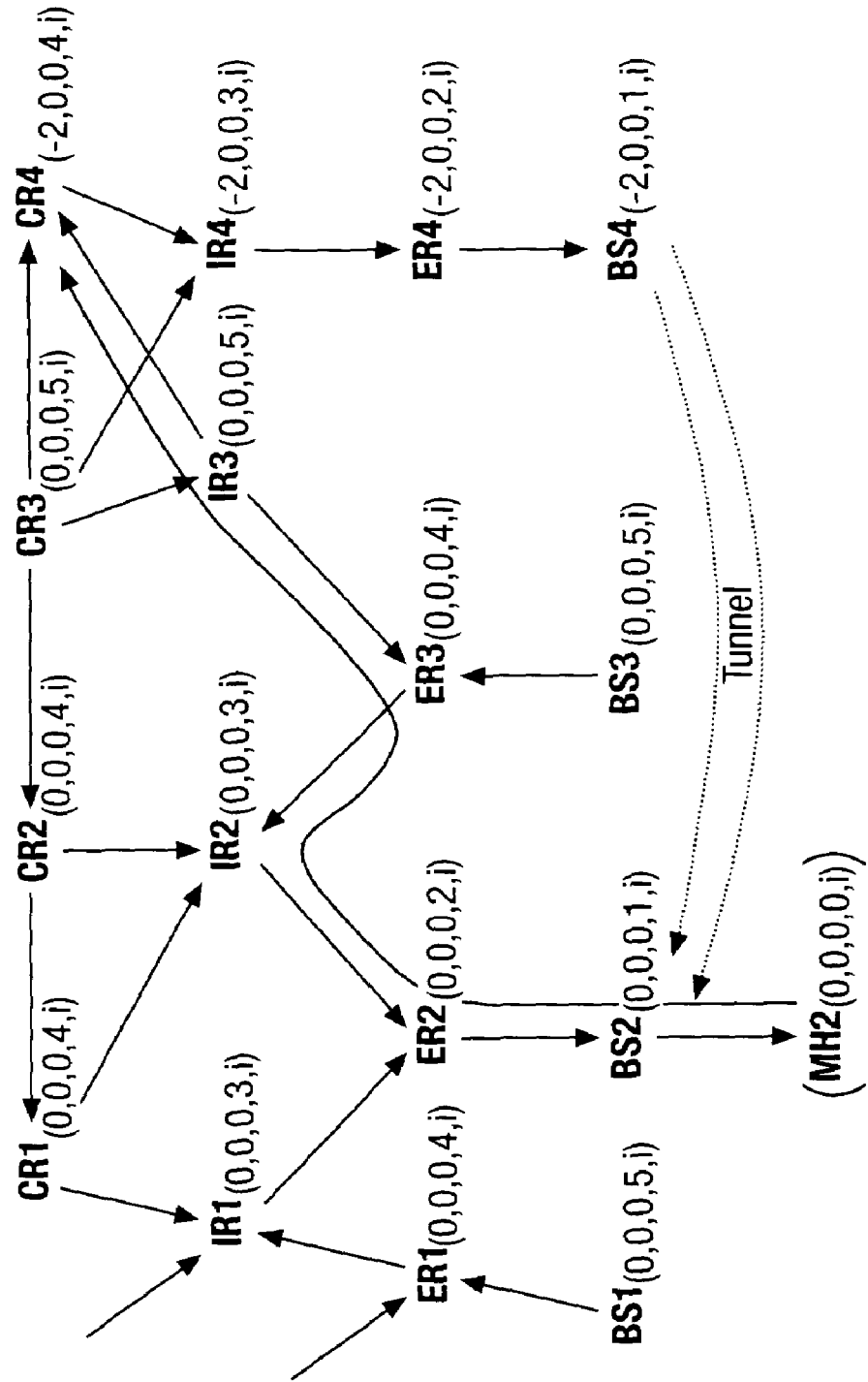
Figure 22:
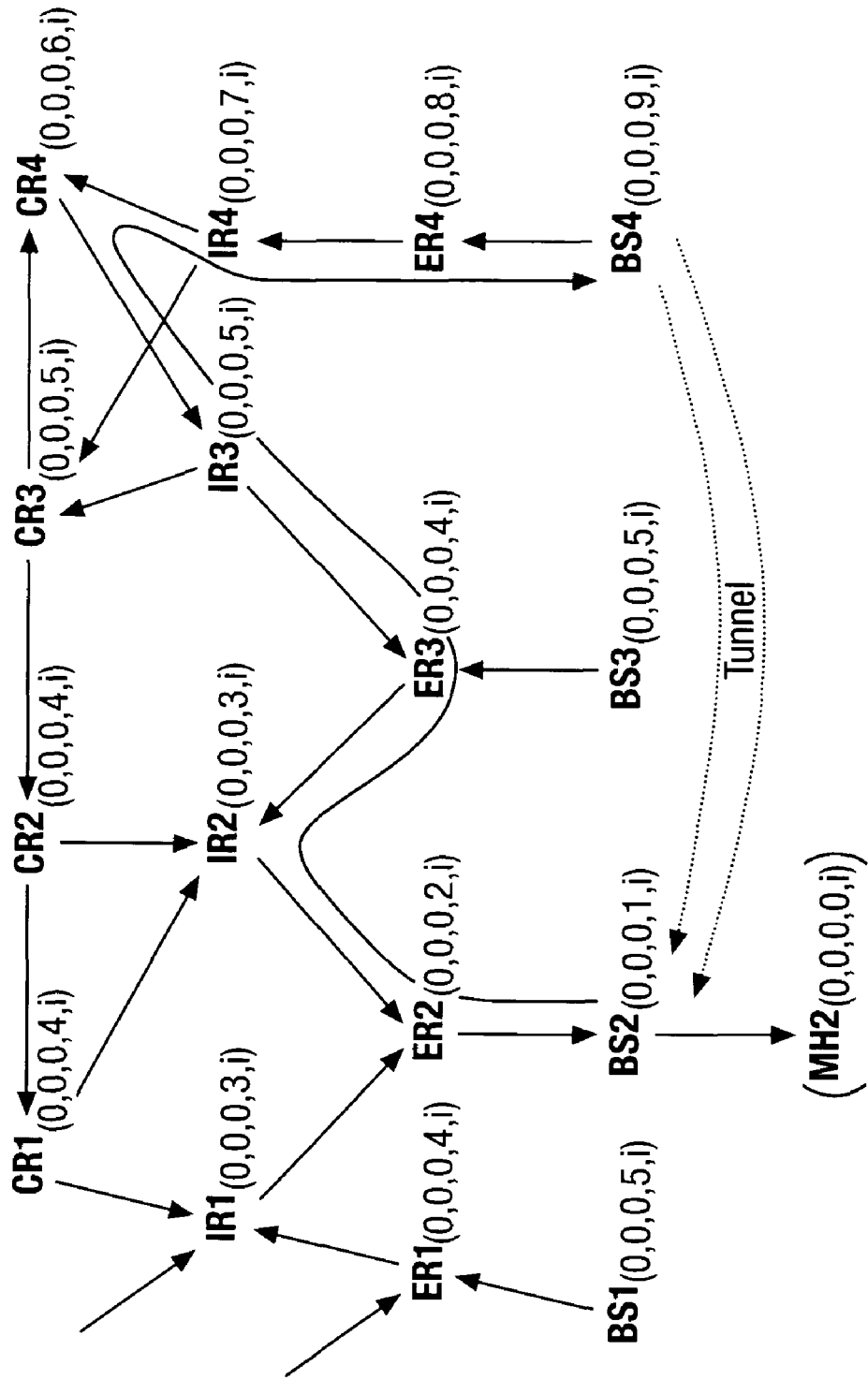

In addition to the updating of heights along the unicast update route, the updated heights are advertised to each immediately adjacent node. Any node having a negative $\tau$ time value in its own height which receives an advertisement indicating the resetting of a negative $\tau$ time value to 0, as in the case of access node BS3 (as illustrated in FIG. 20), also resets its own height to an "all-zero" reference level, defines its $\delta$ value to indicate the number of hops to the (now virtual) mobile station via the allocating access node, and generates an advertisement of its own new height and transmits it to all of its own neighbours. Any neighbours receiving an advertised new height which do not reset their own height do not propagate the advertisement any further.

Figure 23:
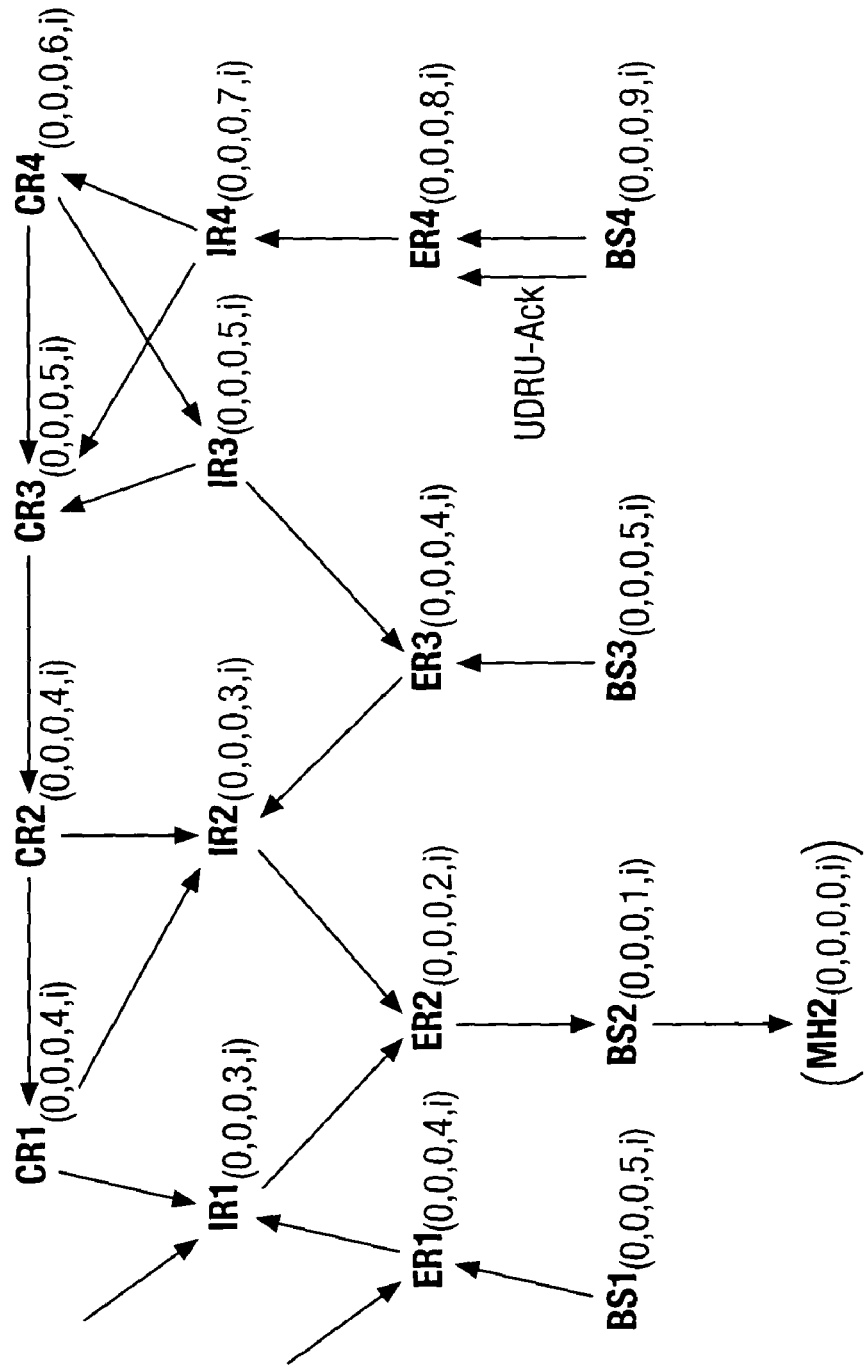

As illustrated in FIG. 23, once the UDRU packet is received at the current access node BS4, the current access node deletes the state associated with the mobile node MH2 in its routing tables and transmits a UDRU-Ack message, along the routing path just created by the unicast-update, towards the allocating access node BS2, thereby relinquishing tentative control of routing for the IP address previously used by the mobile node MH2.

Figure 24:
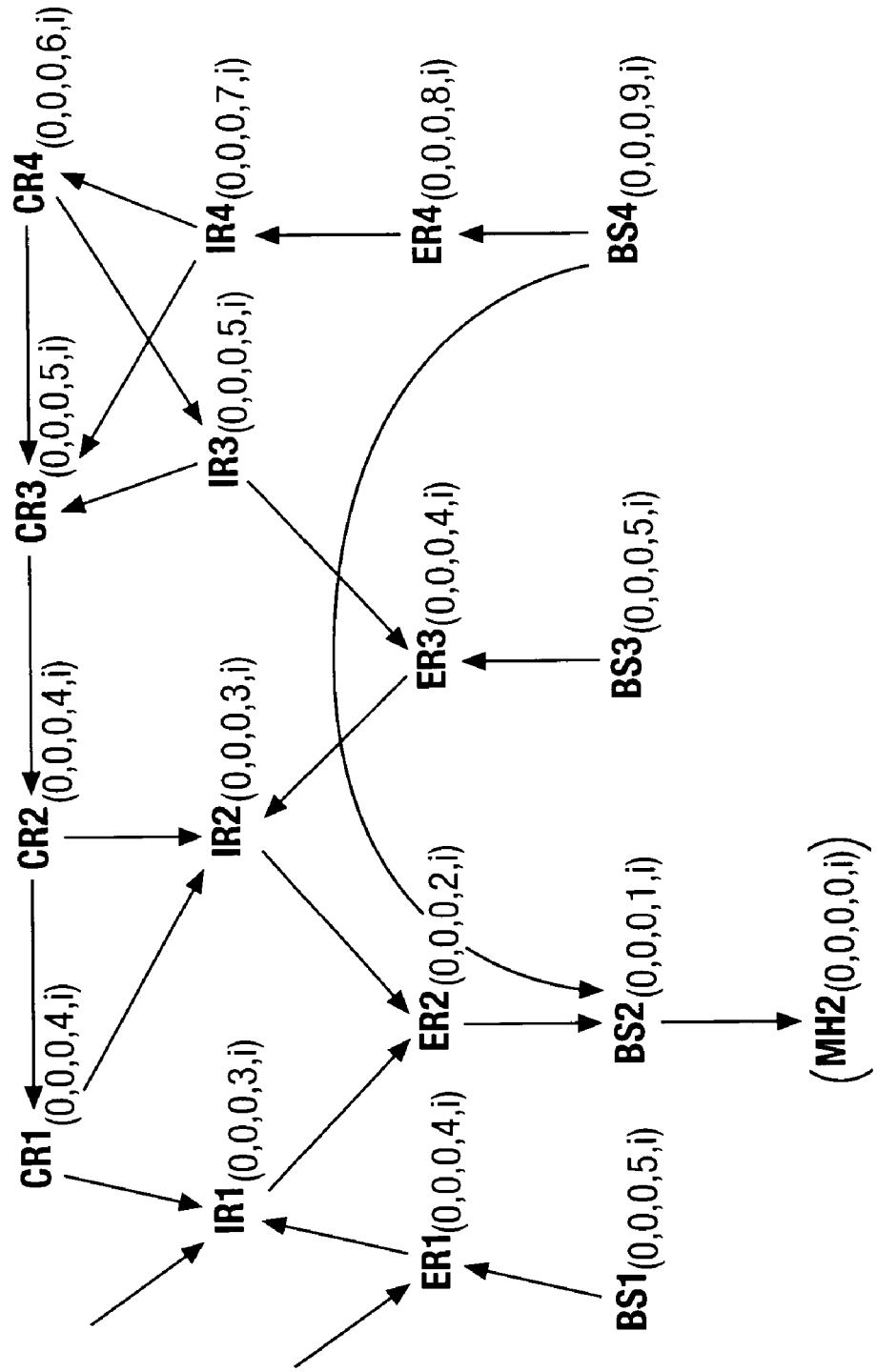
Figure 25:
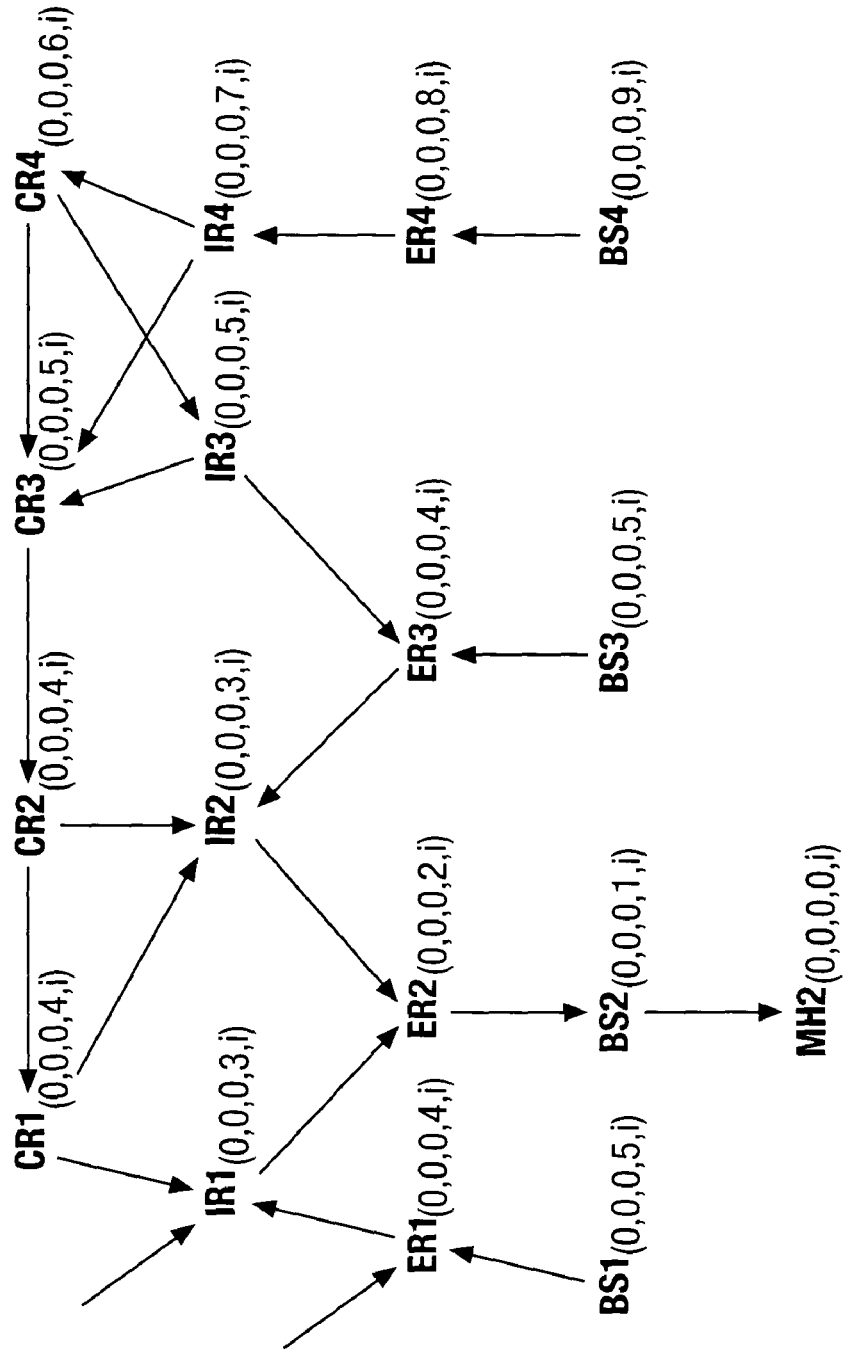

As shown in FIG. 24, the UDRU-Ack packet eventually propagates to the allocating access node BS2. On receipt, the allocating access node BS2 removes all state associated with the mobile node MH2 and reassumes control of routing for the IP address. The IP address may then once again be dynamically allocated, to a different mobile node MH3 starting an access session in the service area of the access node BS2, as shown in FIG. 25.

In FIGS. 28 to 38, to be referred to below, the heights of each node in the aggregated DAG, directed to the allocating access node BS2 for the IP address in question, are indicated. Where a host-specific DAG height, specific to the IP address of the mobile node, is defined (due to a mobility-rated update having occurred), these negative heights are indicated below the aggregated DAG heights.

FIGS. 28 to 31 illustrate a procedure whereby, when a mobile node has been handed over between a number of access nodes since being allocated an IP address at the allocating access node BS2, the routing within the infrastructure can be improved by transmitting a routing update re-directing links between nodes in the infrastructure along a path linking the new, or current, access node BS5 and the allocating access node BS2. In the example shown, the mobile node MH2 is undergoing a handover between an old access node BS4 and a new access node BS5. The handover may proceed in accordance with either of the processes described in relation to FIGS. 2 to 11 or 12 to 16. The unicast update packet UUPD transmitted from the new access node BS5 into the infrastructure ER5 may be identical with, and occur at the same points in the handover procedure as, that described in relation to the process of either of FIGS. 2 to 11 or 12 to 16.

Figure 28:
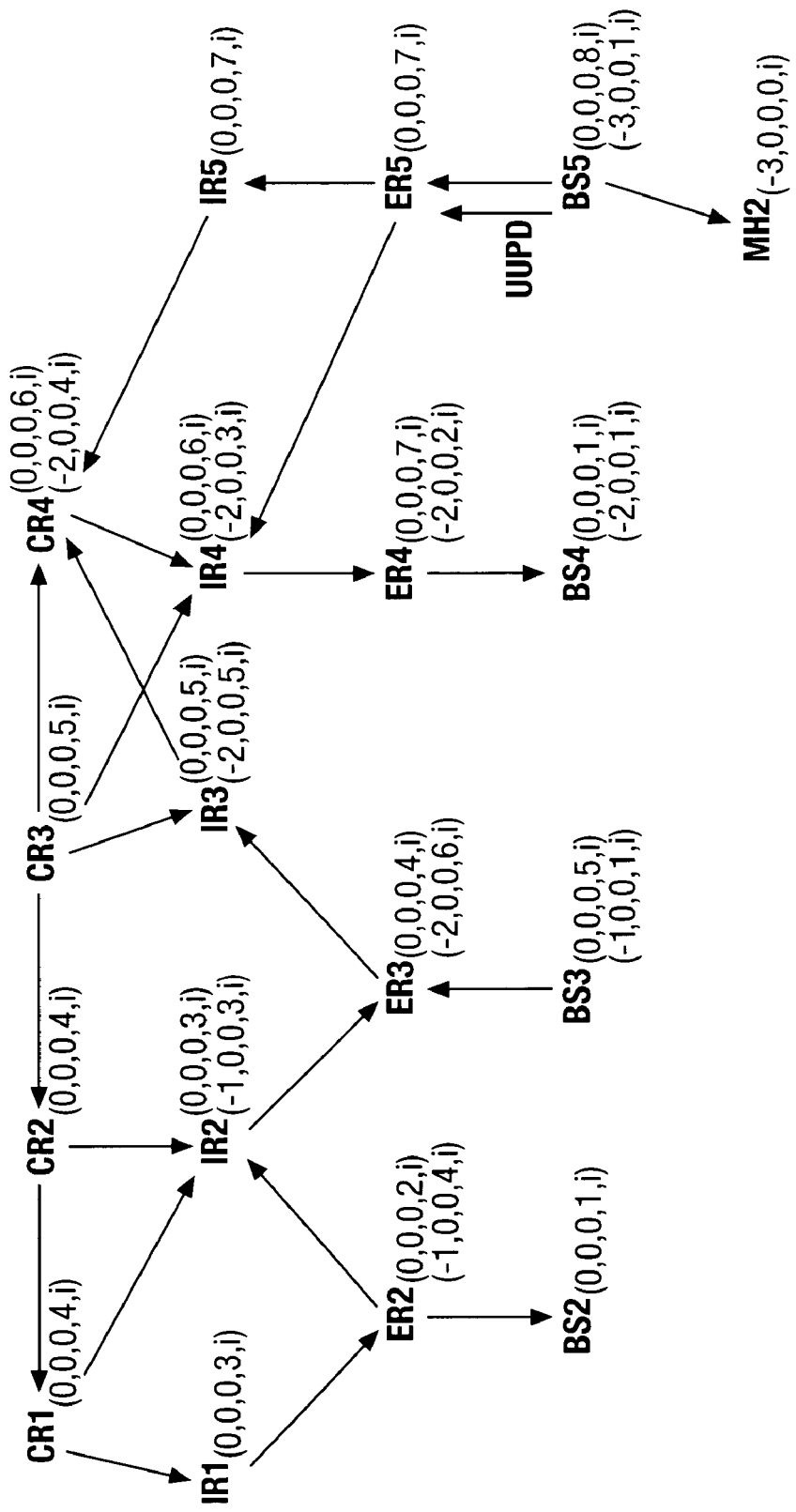
FIGS. 28 to 38 illustrate routing update procedures in accordance with embodiments of the invention.

The transmission of the UUPD packet initiates a routing update procedure in the infrastructure which accounts for a further instance of mobility of the mobile node MH2. Thus, the mobility-related updated heights indicate a third occurrence of mobility, with a $\tau$ value of −3 used in the newly-defined TORA heights. As illustrated in FIG. 28, both the mobile node MH2 and the new access node BS5 update their heights with the −3 $\tau$ value, before the UUPD packet is generated and sent to node ER5. The UUPD packet is addressed to the old access node BS4, the UUPD packet being passed along a unicast route updating path between the new access node BS5 and the old access node BS4. This may be achieved by forwarding the UUPD packet along a DAG defined in the AS for the old access node BS4 itself.

Figure 29:
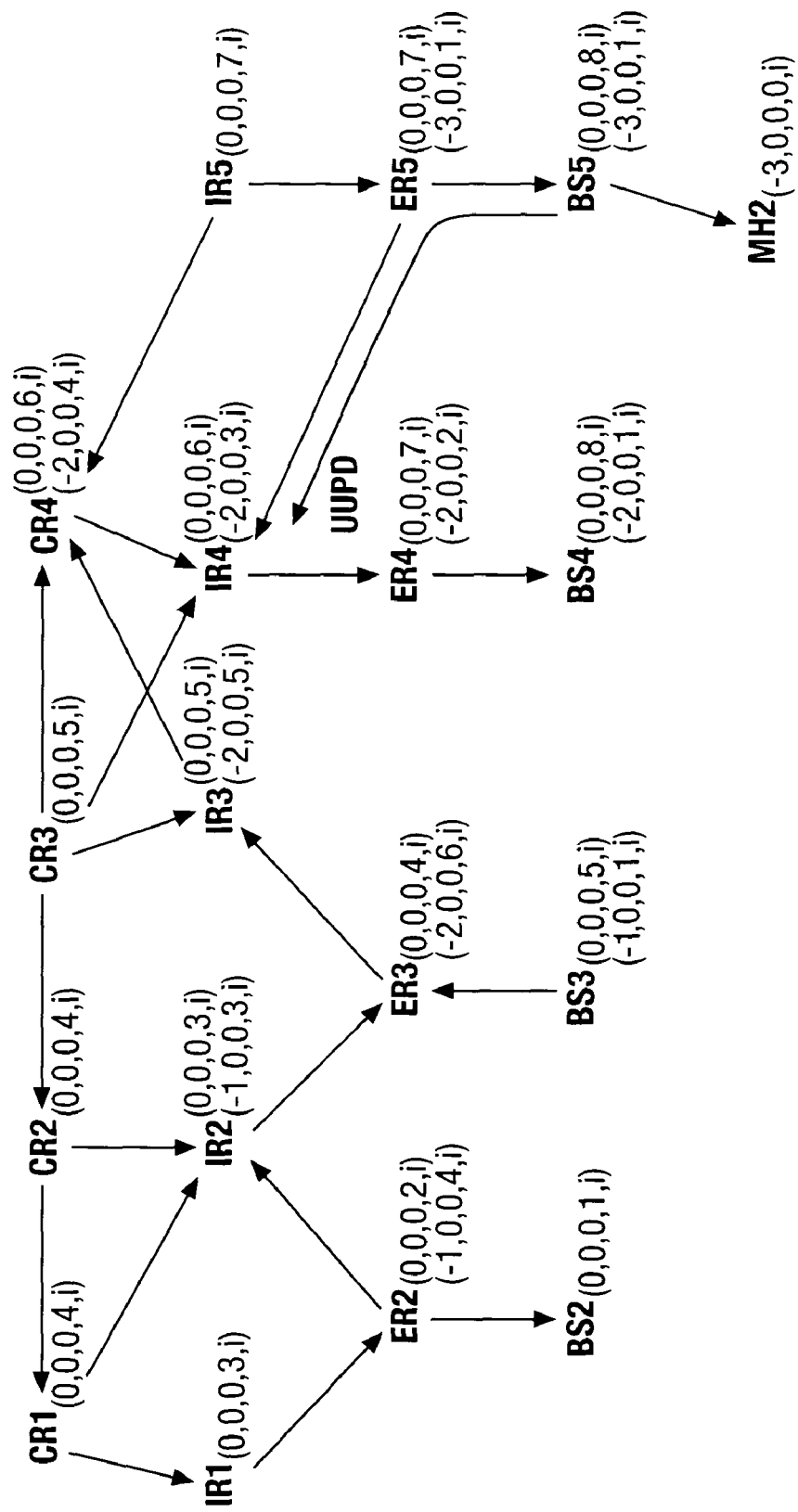

As shown in FIG. 29, the UUPD packet is forwarded from node ER5, which updates its own height on receipt of the UUPD packet, to the next node along the unicast path, node IR4. In this embodiment, each node of the AS is arranged to process a unicast-directed routing update message such as the UUPD packet by determining whether the UUPD packet indicates an occurrence of mobility above a predetermined threshold. In this example, the threshold is set at two instances of mobility. Therefore, the third instance of mobility indicated by the UUPD packet is above the predetermined threshold. If a node detects that the UUPD packet indicates an instance of mobility above the threshold, the node determines whether or not the next node along the unicast updating path, which is directed towards the old access node BS4 coincides with the next node in the aggregated DAG, which is directed towards the allocating access node BS2.

Figure 30:
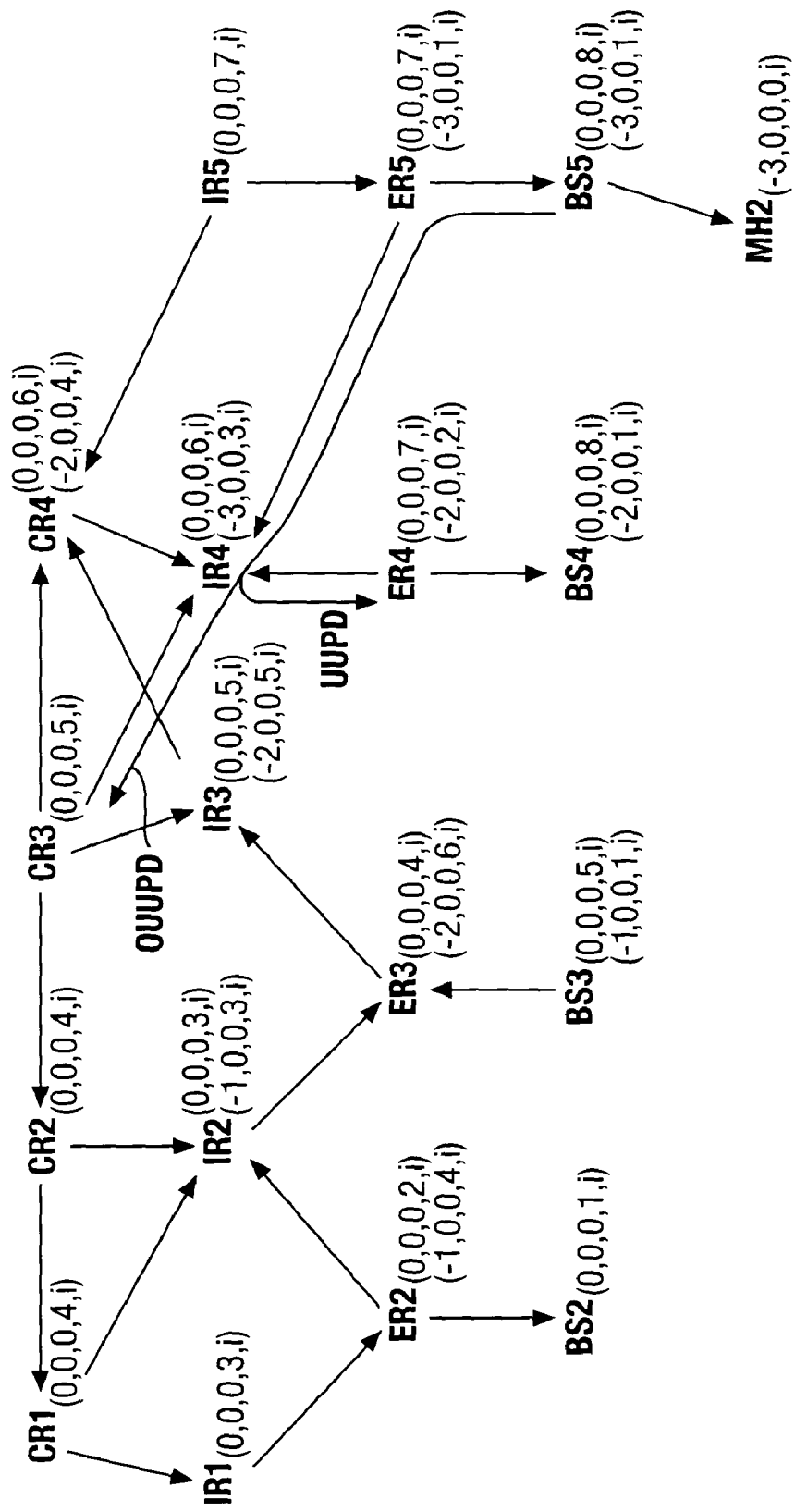
Figure 31:
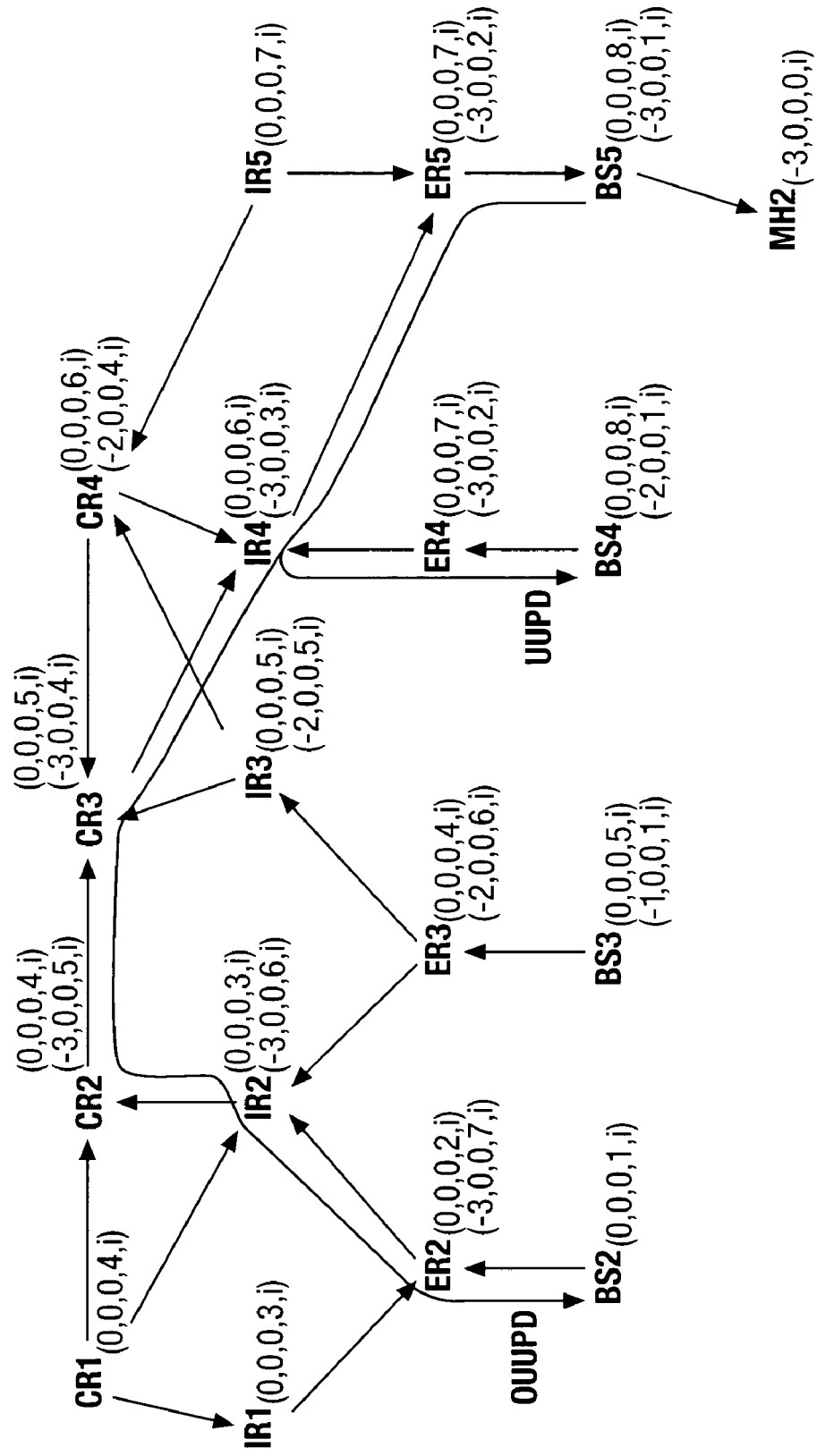

In the case of node IR4, the next node along the unicast updating path is ER4, whereas the next node in the aggregated DAG is node CR3. Accordingly, in this case the nodes do not coincide. Node IR4 still forwards the UUPD packet to the next node ER4 along the unicast path between the new access node BS5 and the old access node BS4. However, in response to detecting the non-coincidence, node IR4 also generates a new message, referred to herein as an optimised unicast update (OUUPD) message, and addresses it to the allocating access node BS2, so that it travels along the aggregated DAG for the mobile node's IP address, which is directed towards the allocating access node BS2. This is illustrated in FIG. 30. The UUPD packet is forwarded and processed as previously described. The OUUPD packet is forwarded along the aggregated DAG towards the allocating access node BS2, and is processed to re-direct the links towards the new access node BS5, by adding host-specific negative TORA heights at each node traversed, the heights having a τ value equal to that injected by the original UUPD packet. In effect, the OUUPD packet defines a routing path between the allocating access node BS2 and the new access node BS5, which follows (in the reverse direction) one which was previously computed when the aggregated DAG was initiated as being an optimal route between the allocating access node BS2 and the new access node BS5. This contrasts with the routing path defined by the individual mobility-related updates caused by subsequent UUPD packet updates, insofar as the routing paths defined by the multiple individual mobility-related updates may not be well optimised for routing packets from all nodes in the AS. Take, for example, data packets arriving in the AS via core router node CR1. Referring to FIG. 28, if only the links local to the path between the new access node BS5 and the old access node BS4 were re-directed on mobility of the mobile node MH2, a packet arriving via node CR1 would be routed to new access node BS5 via each of nodes IR2, ER3, IR3, CR4, IR4 and ER5. An improved routing path would be a routing path traversing only nodes CR2, CR3, IR4 and ER5, respectively. As shown in FIG. 31, the effect of the OUUPD message is to re-direct links within the AS, in particular (but not exclusively) those links between nodes, such as node CR2 and node CR3, which are relatively high in the network hierarchy. The effect of multiple individual UUPD packet updates is to re-direct links local to shortest paths between neighbouring access nodes, such as BS4 and BS5, which tend to be at the topological "edge" of the AS. Therefore, the UUPD packet updates may be referred to as "shallow" routing updates. On the other hand, the effect of the OUUPD packet updates is to re-direct links along an optimised path which connects topologically distant access nodes, such as current access node BS5 and the allocating access node BS2. If an AS is hierarchically structured, an optimised path between such topologically distant access nodes is likely to include nodes which are relatively high in the infrastructure hierarchy, such as CR2 and CR3. Therefore, the OUUPD packet updates may be referred to as "deep" routing updates.

As illustrated in FIG. 31, the final recipient of the OUUPD packet is the allocating access node BS2. Once allocating access node BS2 receives the OUUPD packet, the allocating access node BS2 may, according to one variant of routing protocol, end the procedure and thereby allow the OUUPD message to go unacknowledged as a default, for signalling efficiency. Whilst in the large majority of cases the OUUPD message will arrive safely at its destination, the OUUPD message may for some reason be dropped, for example due to link failure or overloading of the network, during its transit towards the allocating access node BS2. However, with routes provided by the shallow routing update still being present, the rare loss of an OUUPD packet will not affect service in the AS.

In an alternative routing protocol in accordance with the invention, the OUUPD message is acknowledged as a default, by transmitting an OUUPD-ack message along the newly-defined routing path between the allocating access node BS2 and the new access node BS5. This allows the new access node BS5 to monitor for receipt of the OUUPD-ack packet and to re-transmit an OUUPD packet if an acknowledgement is not received within a time-out period, thereby making the deep routing update reliable. In a further alternative, the decision whether or not to acknowledge the OUUPD packet may be made at the allocating access node BS2 based on a characteristic of the OUUPD packet. Such a characteristic may be the height of the update indicated by the OUUPD packet, with heights indicating higher instances of mobility being acknowledged but lower-instance updates not being acknowledged. A further, or alternative, characteristic may be the type of OUUPD packets transmitted by the new access node BS5. For example, a first type of OUUPD packet may be one which contains a flag indicating that acknowledgement is required, whereas another type may be one indicating that no such acknowledgement is required. Other such characteristics include an amount of time elapsed since the packet was transmitted, a distance or number of hops over which the transmission occurred, a serial number of the packet (e.g. every nth OUUPD packet being acknowledged at the allocating access node), arrival from a near routing area or location area. Acknowledgement decisions may also be based on customer profiles.

In one embodiment of the invention, host-specific routing entries are held as soft-state entries in the routing nodes of the AS, with a soft-state timer being triggered after a predetermined time period which causes the erasure of the routing entries injected as a result of a shallow routing update. In combination with this, a periodic routing update which generates an OUUPD message at the current access node, which preferably goes unacknowledged as described above, may be carried out with a periodicity such that a plurality of OUUPD message update procedures are carried out during a single soft-state time-out period. This ensures that the deep-injected routing will gradually replace the shallow routing.

Whilst in the process described above the deep routing update is triggered in conjunction with a shallow routing update, the two types of update may in addition, or in the alternative, be triggered separately. Triggering of a deep routing update is in the process described above based on the number of instances of mobility (i.e. handoffs between access nodes). Deep routing updates may in addition, or in the alternative, be triggered by one or more of a timer in the mobile node or current access node (deep routing updates being triggered at periodic intervals), a change of zone (sub-region of the AS) in which the mobile node is receiving service, a separate routing control node (which could determine optimum times to trigger a deep routing update based on knowledge of traffic or routing performance) and/or service quality monitoring procedures in the mobile node. Quality of Service or other subscriber-profile requirements may be used to determine the frequency of deep routing updates. Triggering in conjunction with a shallow routing update, based on any of the alternative triggers described above, may be achieved by a specific flag added by the mobile node or current access node to a UUPD message.

Figure 32:
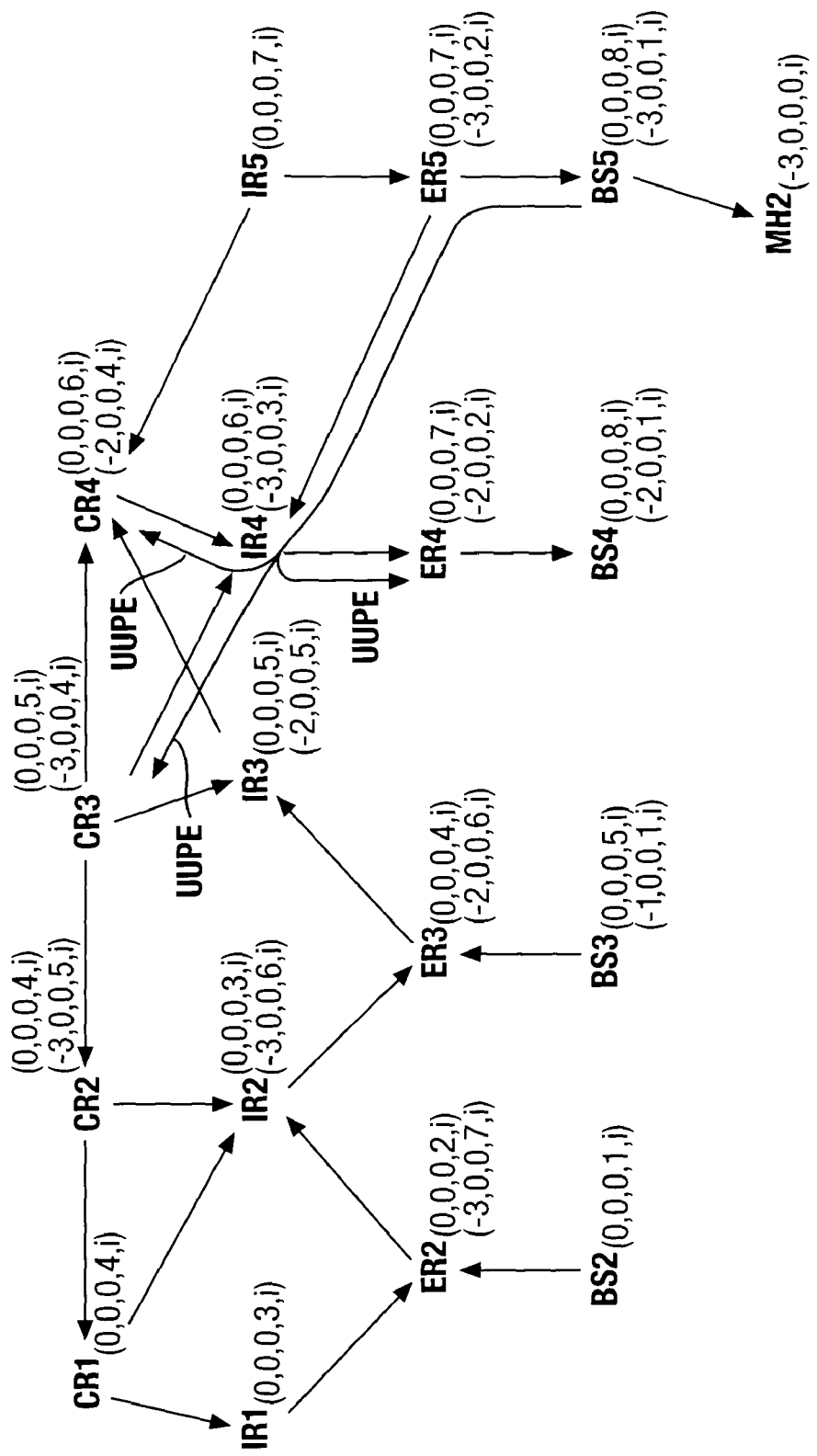
Figure 33:
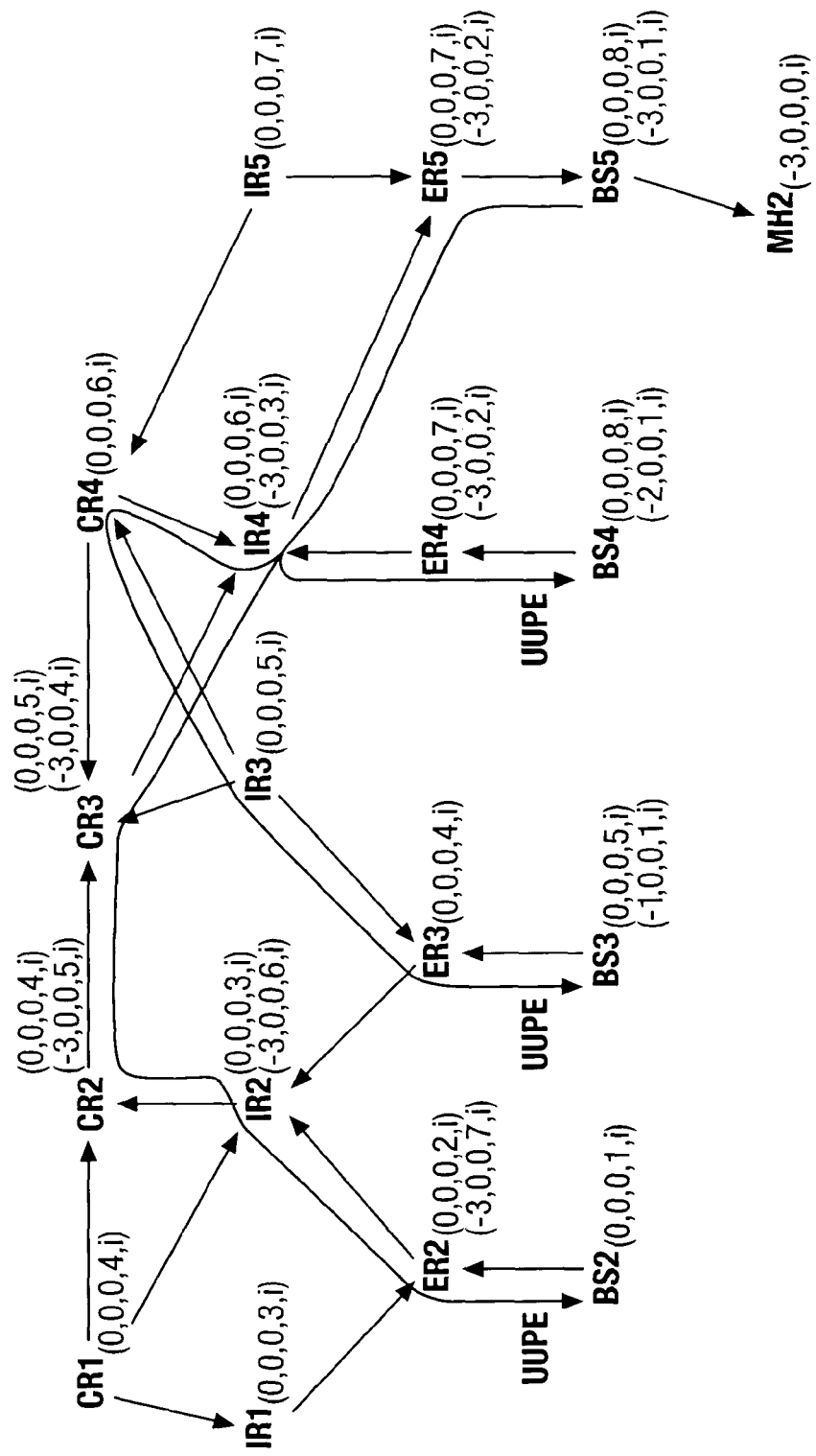

FIGS. 32 and 33 illustrate a variant of the routing update procedure illustrated in relation to FIGS. 28 to 31. In this variant, a further routing update message is generated to delete sub-optimal routes previously generated due to mobility of a mobile node, when an OUUPD packet update is performed. In order to ensure routing paths towards the new access node BS5 remain, the UUPD packet generated at the new access node BS5 is one indicating that an acknowledgement is required from the allocating access node BS2 on receipt of the OUUPD packet (alternatively, the routing protocol may be arranged such that all OUUPD packets are acknowledged). In this embodiment, a unicast-undirected partial erase (UUPE) message is generated by the new access node BS5 on receipt of the OUUPD-ack packet. The UUPE packet is passed to any neighbour node which has a host-specific height which has been generated due to mobility-rated updates (any "negative" height node). The UUPE message is transmitted to each such node in order to erase "intermediate" negative heights, that is to say all but the last mobility-related updated heights. In the example shown in FIGS. 32 and 33, the heights generated by the last UUPD and OUUPD packets include a τ value of −3. Therefore, the UUPE packet, or packets, generated and forwarded within the AS have the effect of erasing one or more host-specific heights which have a non-zero τ value of more than a specified value, in this example −3, that is to say either −2 or −1 (an erase height maximum of −2).

A UUPE packet is thus passed along the aggregated DAG route, and to any neighbour having a negative height. Node IR4 thus not only forwards the UUPE packet to the next node in the aggregated DAG, but also transmit a UUPE packet to nodes CR4 and ER4. Each node having an intermediate negative height and receiving a UUPE packet deletes the host-specific height from its routing data tables, such that the aggregated DAG height is then used to calculate the directionality of its links, and forwards a UUPE message to each of its neighbours which it detects as having a negative height. On receipt, nodes BS3 and BS4 delete the host-specific height value from their routing data tables and halt any further transmission of the UUPE packet.

The UUPE packet is forwarded in an undirected manner, insofar as any final destination of the UUPE packet is not defined when the packet is initially generated. The erase is only partial insofar as other host-specific heights may remain, or at least the mobile node MH2 retains the IP address and may inject host-specific heights subsequently. The effect of the UUPE updates is to delete the state provided by previous routing updates, thereby to reduce the amount of host-specific data required to be held in the AS. UUPE updates also generally improve the routing paths in the AS to the new access node BS5. After an UUPE update, routing from, for example, an intermediate access node such as node BS3, which is relatively distant from the current or new access node BS5, but which was involved in a previous mobility-related update, will proceed initially along the aggregated DAG for the IP address in question until the routing path defined by the OUUPD packet update is met. Since the routing path defined by the OUUPD packet update is generally an optimised routing path, the routing provided by erasing previous, and now unnecessary, shallow routing paths, is generally improved. The further mobile node MH2 travels away from its allocating access node BS2, generally the greater the improvement.

Figure 34:
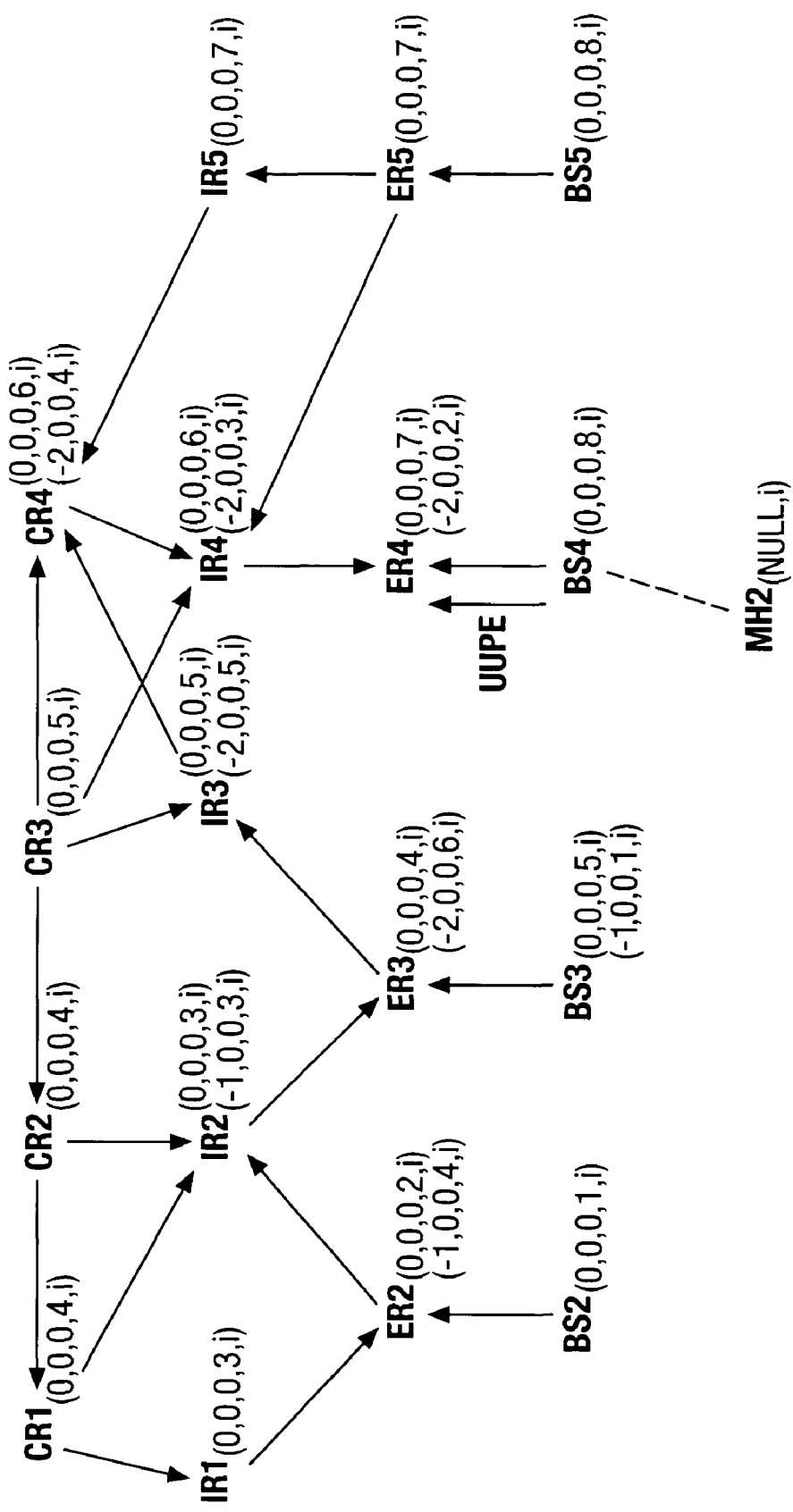
Figure 35:
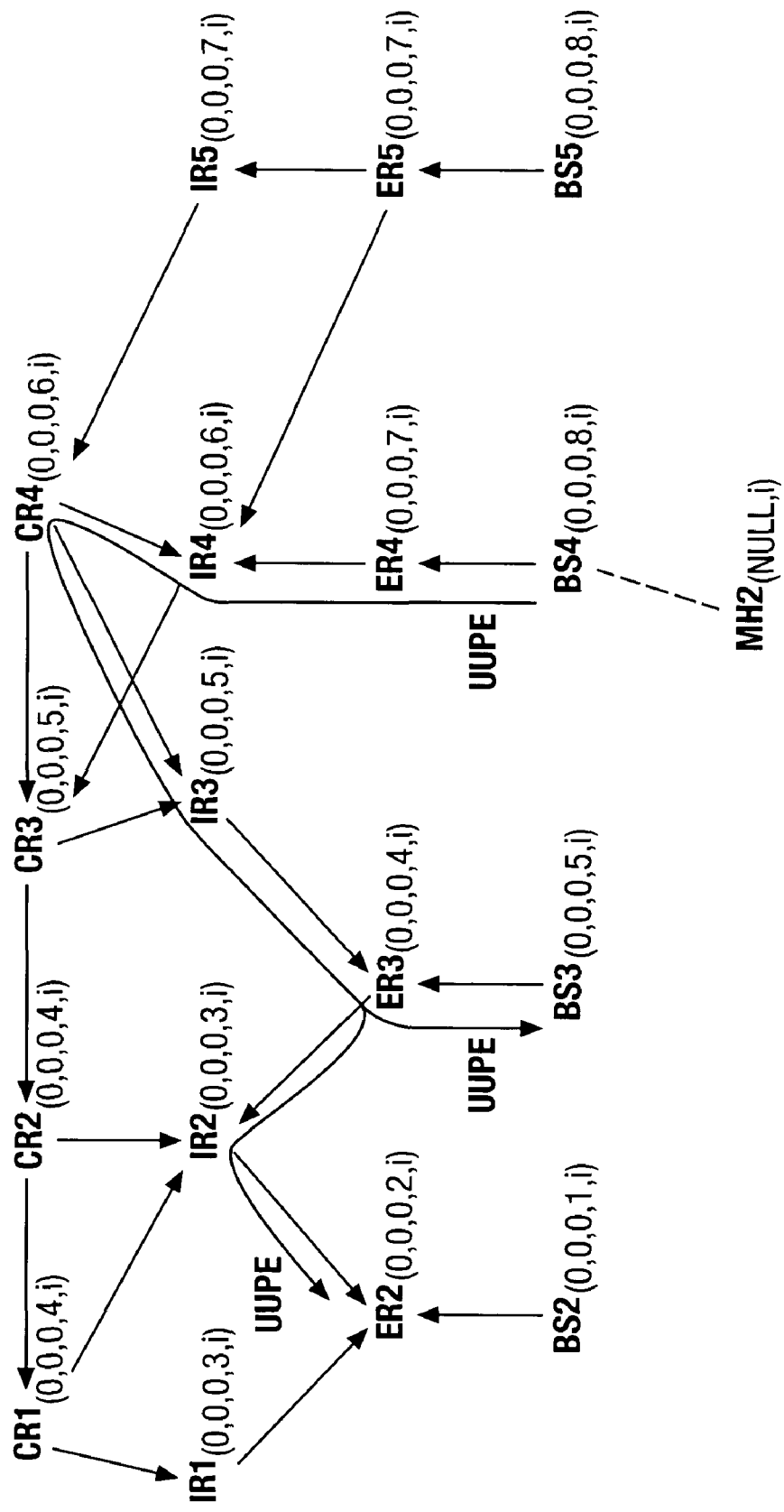

FIGS. 34 and 35 illustrate a further update procedure, which is initiated due to inactivity of the mobile node MH2. For example, the wireless link to the mobile mode MH2 may be lost due to the mobile node entering an area which is not covered by the radio access network. Alternatively, the mobile node MH2 may be switched off for a given period. Further alternatively, the mobile node MH2 may remain switched on, but may receive no packet data for a significant period. An inactivity timer is provided in the current access node BS4 and/or the mobile node MH2, which triggers an erase procedure whereby host-specific routing data table entries are removed from the AS. A UUPE message is used for this purpose, with the specified erase height maximum set at the previous lowest T value. Initially, once the inactivity timer has detected the elapsing of a predetermined period, a trigger is enabled, causing the previously current access node BS4 to delete its host-specific routing data table entry, thereby to redefine the relevant height for the mobile node MH2 as the height of the access node BS4 in the aggregated DAG for the mobile node's IP address (the "all zero" setting"). The current access node BS4 also transmits one or more UUPE messages. As shown in FIG. 35, the UUPE packet update proceeds through all nodes (in the example shown BS4, ER4, IR4, CR4, IR3, ER3, BS3, IR2 and ER2) previously having a host-specific height stored in a routing table, and these host-specific heights are deleted. Note that, in contrast with the UDRU packet update procedure previously described, the IP address of the mobile node MH2 is not released in this procedure for reallocation by the allocating access node BS2. Instead, the mobile node MH2 retains the IP address initially allocated by the allocating access node BS2, such that at any point when the mobile node MH2 next becomes active, it may re-use the same IP address. Alternatively, a second more prolonged inactivity timer at the allocating access node BS2 may initiate the reallocation of the IP address after a further predetermined period following the deletion of the host-specific routing for that address.

Figure 36:
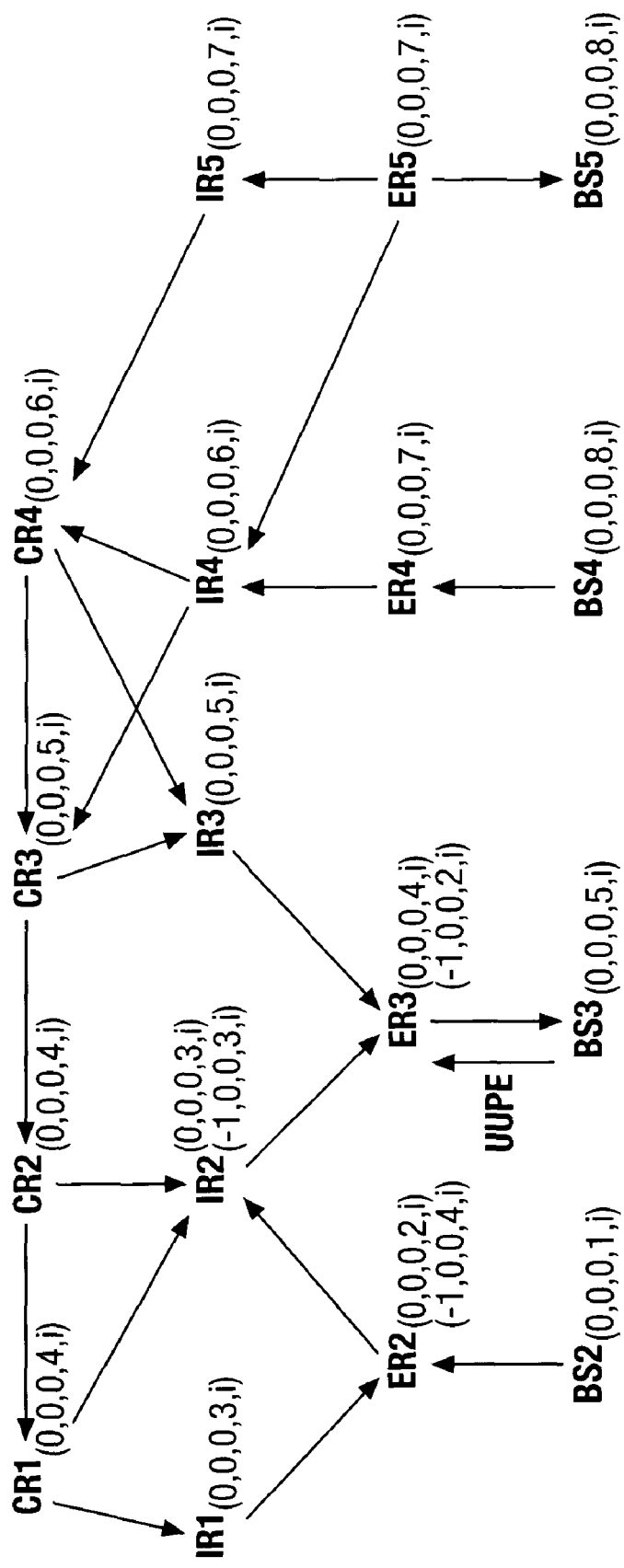
Figure 37:
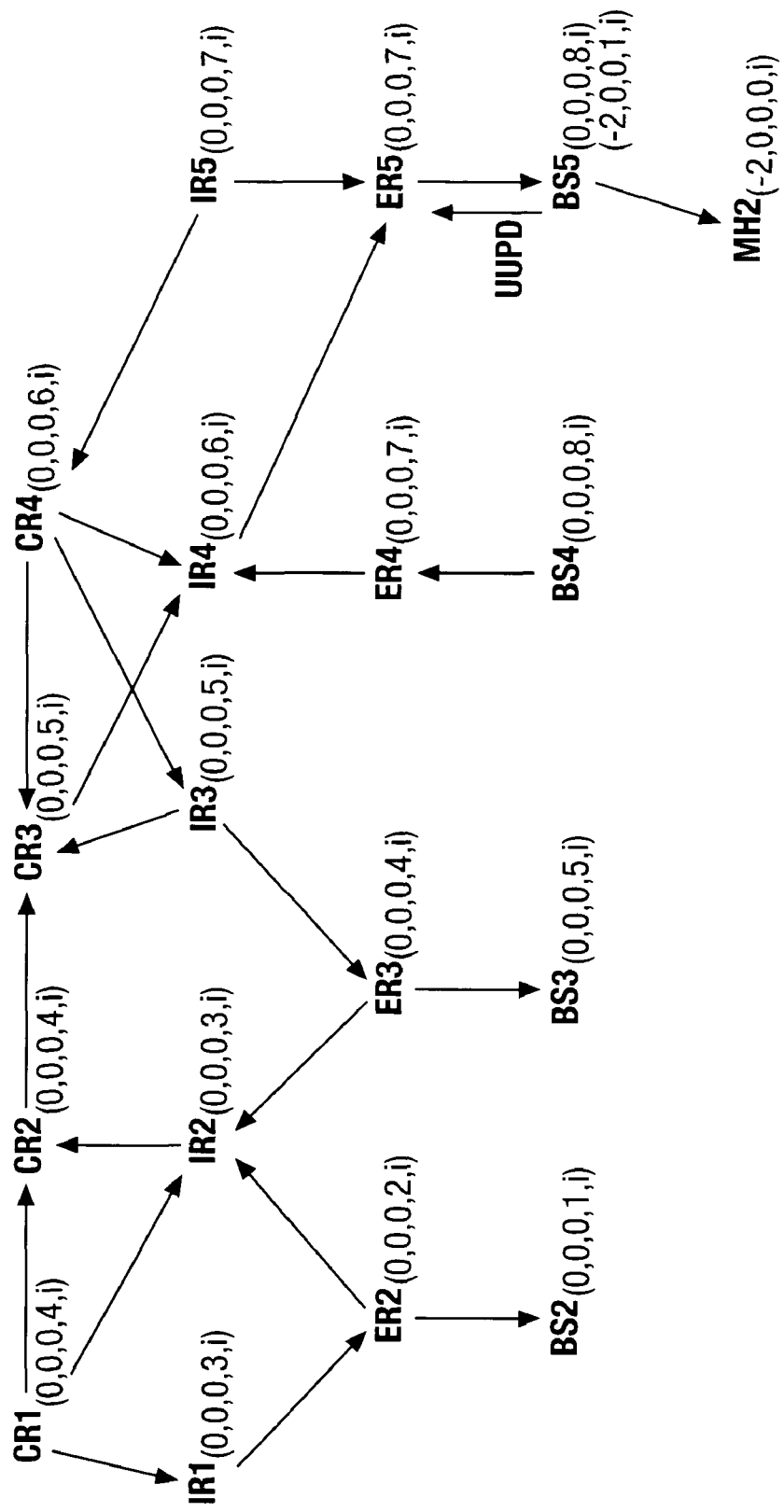
Figure 38:
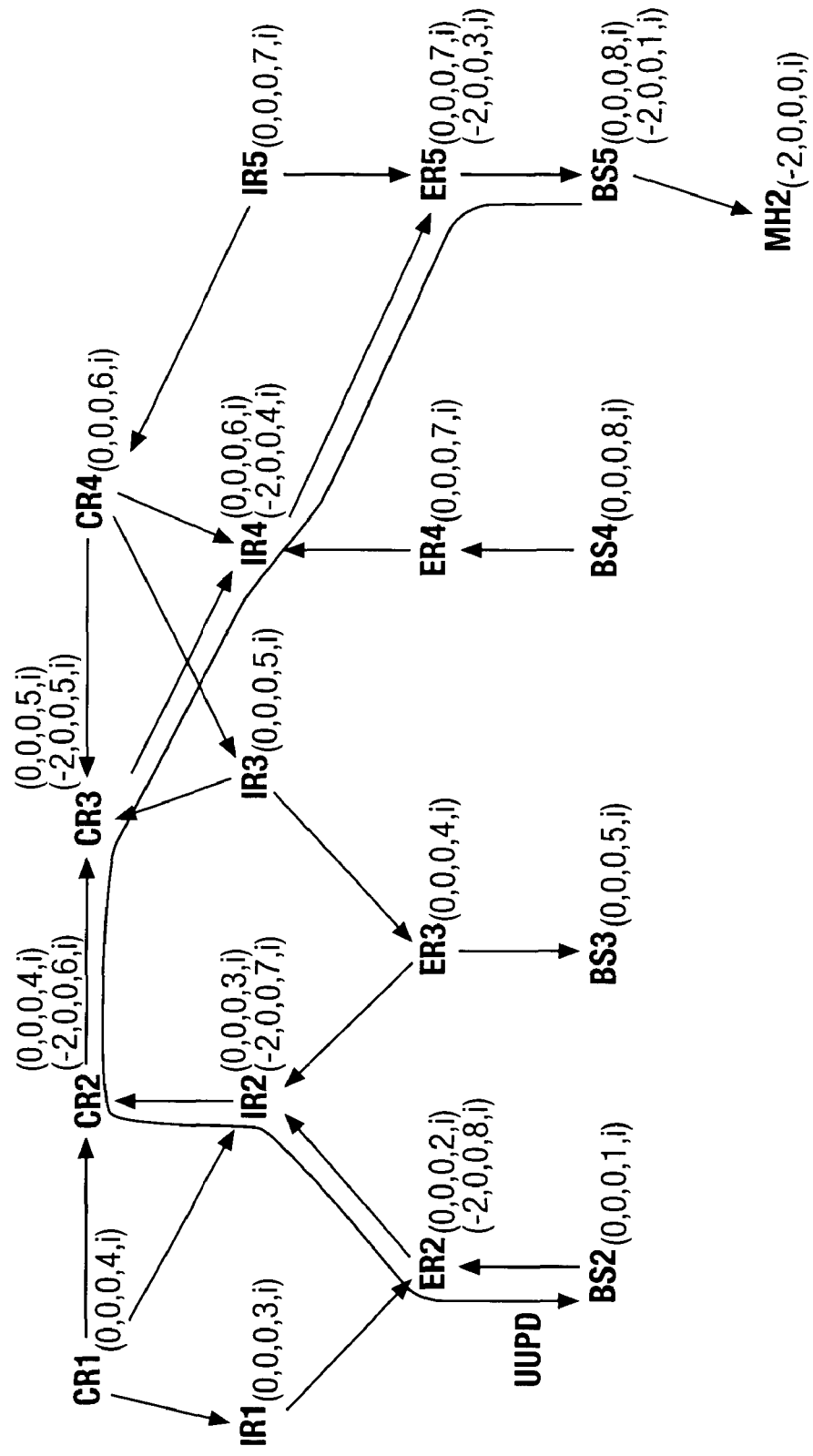

FIGS. 36 to 38 illustrate a procedure whereby a temporarily inactive mobile node MH2 may initiate a routing update which results in routing in the AS being redirected to the access node BS5 via which the mobile node MH2 is to receive service. In the example shown in FIGS. 36 to 38, the mobile node MH2 previously temporarily lost its wireless link, either due to switch off or due to lack of coverage, after receiving service in the AS via access node BS3. One mobility-related update was previously performed in the AS, and erased due to inactivity, following loss of the wireless link with previous access node BS3, by means of a UUPE routing update as illustrated in FIG. 36.

When the mobile node MH2 undergoes the loss of its wireless link, either due to power off or lack of coverage, it stores the IP address of its last access node, the time of the loss and at least an indicator of the previous number of instances of mobility-related updates which occurred, so that the next update which is initiated when it connects via a new radio link can be readily indicated as being the most recent mobility-related update. Therefore, as shown in FIG. 37, the mobile node MH2, on forming a new radio link to the radio access network and to the access node BS5, decrements its T time value to −2, and transmits its new TORA height value to the new access node BS5, along with the IP address of its last access node and the time of the loss. On receipt, new access node BS5 initiates an UUPD update. The destination of the UUPD packet depends upon the time elapsed since the loss of the last link, which the new access node BS5 computes.

If the elapsed time is significantly greater than the preset time after which inactivity timers trigger partial erases, such that it can be assumed no host-specific heights remain, the destination is the allocating access node BS2. The UUPD message follows the path defined by the aggregated DAG for the mobile node's IP address, to the allocating access node BS2. As shown in FIG. 38, each successive node receiving the UUPD message sets a new host-specific height in its routing protocol data according to the data received in the UUPD message. Accordingly, following the UUPD update, all nodes in the AS have a routing path, defined by the host-specific DAG towards the new access node and BS5.

If the elapsed time is not significantly greater (allowing for any inaccuracies between timers), the destination selected for the UUPD packet is the last access node BS3. If, on receipt of the UUPD packet, the last access node BS3 still has host-specific routing present, routing throughout the AS is correctly directed towards the new access node BS5. If on the other hand the host-specific routing has been deleted, the last access node BS3 sends a negative acknowledgement (N-ack) to the new access node BS5, to which the new access node BS5 reacts by transmitting a further UUPD packet to the allocating access node BS2 to establish correct routing throughout the AS.

Figure 39:
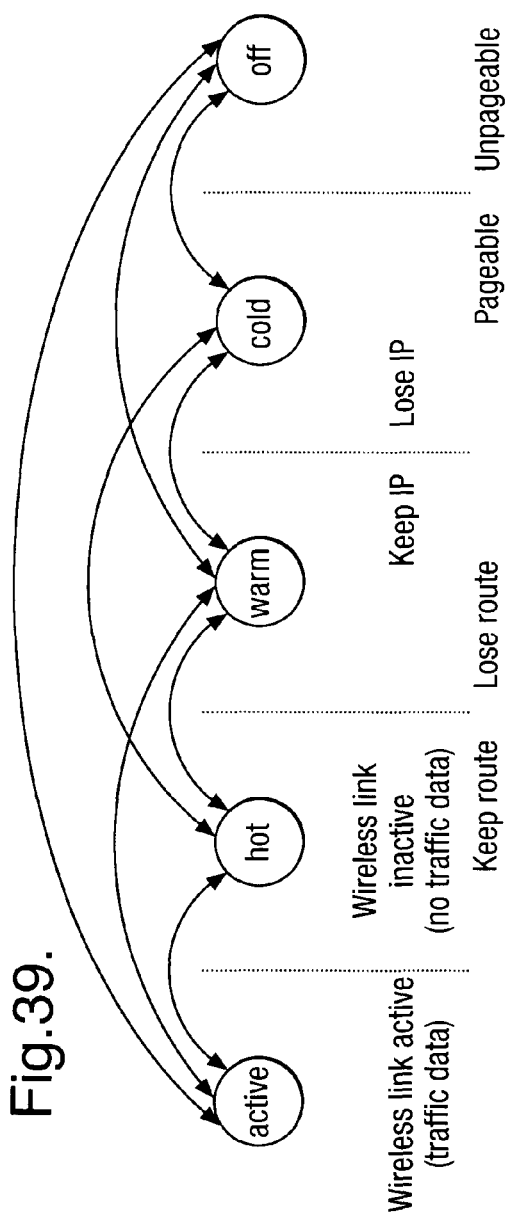
FIG. 39 is a state diagram schematically illustrating different possible states for a mobile node.

FIG. 39 shows the five states (active; hot standby; warm standby; cold standby; off) that a mobile node may be in with arrows indicating the state transitions an MN may undergo. A MN is active when it is actively sending or receiving data with an AR. Its radio link level interface is transmitting data traffic (wireless link up); it has an allocated IP address; and host-specific routing is present in the domain for routing data packets towards the MN. An MN is in hot standby when it is no longer actively receiving or transmitting data traffic with an AR (i.e. when an IP activity timer has expired) but when a route holding timer has not expired. The MN has an IP address and host-specific routing within the network infrastructure, however, the MN has no radio interface link to the AR. Movement between access nodes generates handoff processing and host-specific route injections both in the active and hot standby states.

An MN is in warm standby state when the network nodes no longer maintain host-specific routing for the MN (i.e. when a soft-state route holding timer has expired or when the host-specific routing has been erased). The MN still has an IP address, that is to say re-allocation of the IP address is prevented in this state but movement of the mobile node between access nodes does not generate handoff processing. Instead, the MN generates location updates periodically (i.e. on expiry of a location update timer) or on the basis of distance travelled from the cell in which location was last updated. The MN must be paged for when incoming data requires delivery to the MN. An MN is in cold standby when it has no IP address, because a previously assigned address was returned for reallocation to the allocating access router (by the method described above) due to inactivity (i.e. an IP address hold timer has expired in the last access node and/or the mobile node). The MN must be paged for, using a static identity (such as an International Mobile Subscriber Identity (IMSI)) when data is incoming. Also, the MN must register with a new access node and be allocated an IP address. Finally, an MN is in the off state when it has been powered off, or is otherwise uncontactable (e.g. due to a long period of loss of network coverage). The MN is unpageable in this state.

Figure 40:
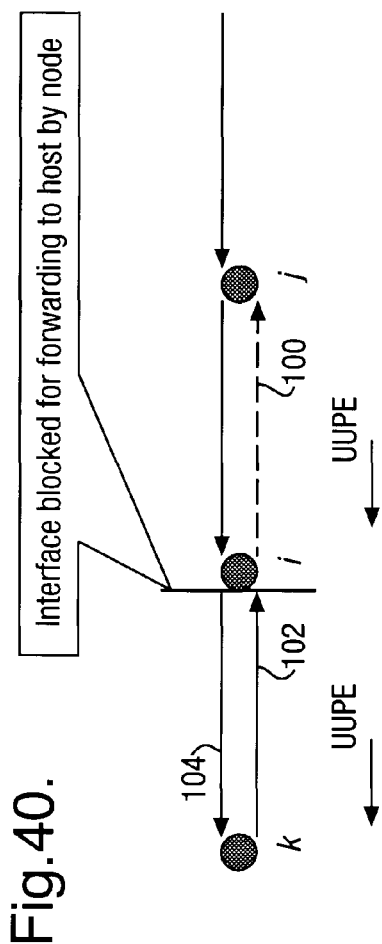
FIG. 40 illustrates a loop prevention procedure in accordance with an embodiment of the invention.

FIG. 40 illustrates a procedure carried out in nodes undergoing a host-specific route erasure process, such as that produced by a UUPE update, which prevents unwanted loops occurring in the AS during that process. During the erasure process, a particular node, in this case node i, receives a UUPE message from an initially downstream neighbour, node j. FIG. 40 illustrates the initial downstream directionality of the link with dashed arrow 100. Before receipt of the UUPE message, node i also has one or more upstream neighbours, represented by node k. The initial directionality of the link is indicated by arrow 102. When node i erases its host-specific height on receipt of the UUPE message, its routing table entries indicate node k as being a downstream node, since node k has a host-specific height defined due to a previous mobility-rated update. The directionality of the link, from the perspective of node i, is indicated by arrow 104. On the other hand, until node k receives the UUPE message and updates its own routing tables, the directionality of the link according to node k's perspective remains downstream towards i, as indicated by arrow 102. Hence, data packets received at node k would be transmitted to node i, and node i would re-transmit the packets back to node k, until such time as node k redefines its own height. The procedure may therefore create an unwanted loop in the network. To solve this problem, on receipt of a UUPE message, a node, in this case node i, on redefining its own TORA height, places a temporary blockage on host-specific forwarding for the host in question over all interfaces to nodes that were originally aware of the erased host height, the interface to node k in this example. This may be achieved by node i either caching all packets received over those interfaces for that host, and/or dropping (or causing subsequent droppage, e.g. by reducing a time to live (TTL) value, of) such packets, whilst the blockage is in place. Once node i receives confirmation from the relevant node, in this case node k, that the UUPE message forwarded from node i has been received, the blockage state of node i is deleted. The interface blockage procedure is carried out in each node undergoing host-specific height erasure, whereby redirection of the links is carried out.

Figure 41:
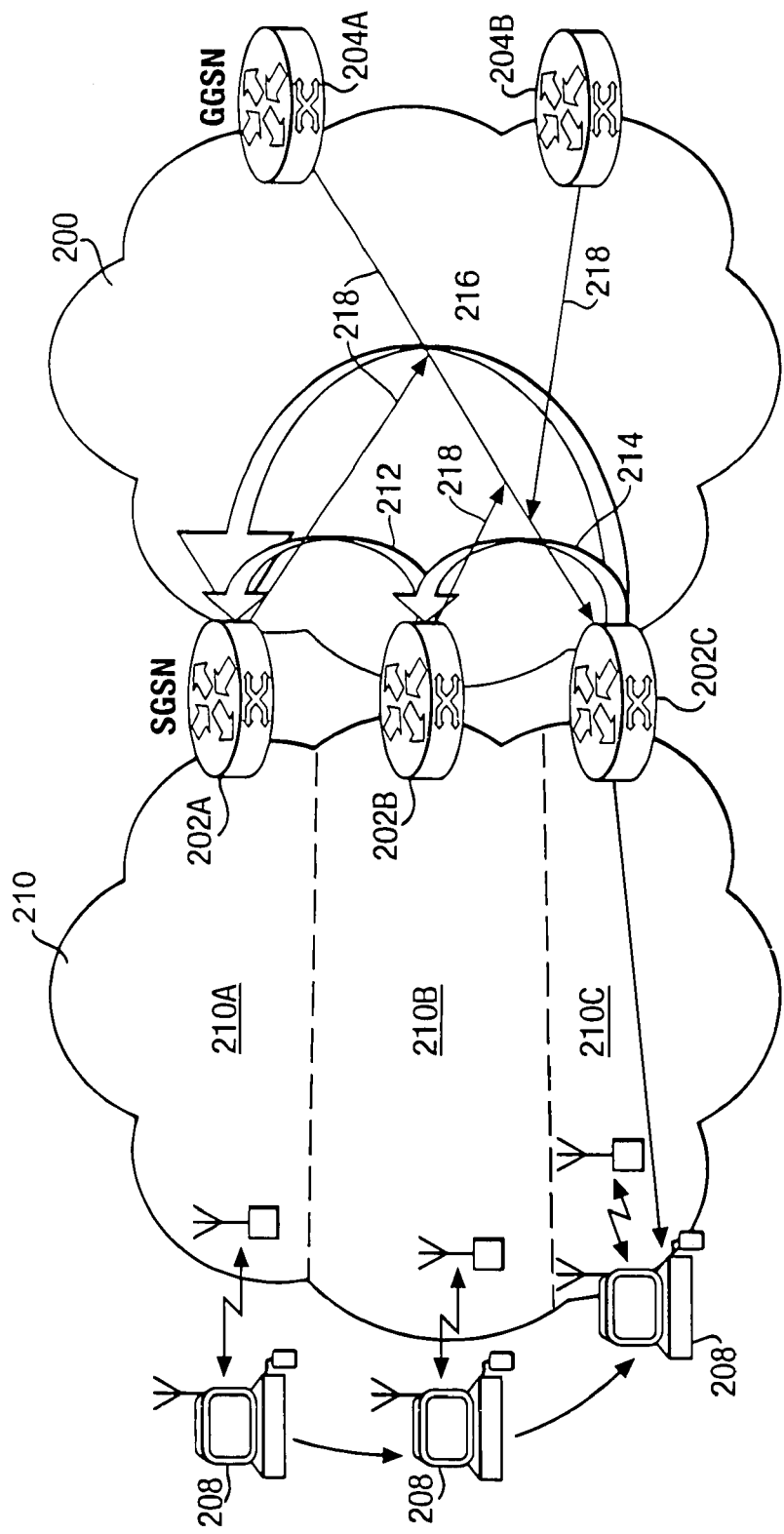
FIG. 41 illustrates a network arrangement in accordance with an embodiment of the invention.

FIG. 41 illustrates an embodiment of the present invention applied to the proposed third generation mobile communication system referred to as UMTS, an ETSI (European Telecommunications Standard Institute) standard. With regard to the current version of the standard, an IP packet data network, referred to as a GPRS (General Packet Radio Service) network is provided for routing data packets between serving GPRS service nodes (SGSNs) arranging the network hierarchy proximate the radio access base station, and gateway GPRS service nodes (GGSNs) which provide access to other data networks, such as the Internet. A tunnelling protocol, the GPRS tunnelling protocol (GTP), is used to transmit data packets between the SGSNs and the GGSNs. On the other hand, the present invention allows data packets to be routed between the SGSNs and GGSNs using a native routing protocol. The modified TORA routing protocol described above may be used inside an IP network 200 connecting SGSNs 202 to GGSNs 204 and/or a radio access network (RAN) 206 used to provide a radio interface to mobile nodes 208.

FIG. 41 illustrates an embodiment in which the modified TORA routing protocol is used only in the IP network 200. A separate portion 210 of the radio access network is associated with each SGSN 202. Therefore, a first portion 210A is associated with a first SGSN 202A, a second portion 210B with a second SGSN 202B, and a third portion 210C with a third SGSN 202C. A mobile station 208 receiving service at any point in the radio access network 206 may receive service from the external packet data network via any GGSN, 204A or 204B.

FIG. 41 illustrates mobility of a mobile station 208 from the first portion 210A, to a second portion 210B, and a further instance of mobility from a second portion 210B to a third portion 210C. Each of these instances of mobility requires a handover between SGSNs. The handover procedures previously described may be used, and all routing update procedures previously described may be provided in the native routing protocol network 200 with the SGSN 202 being the access nodes described. Packet routing nodes within the IP network 200 are not illustrated in FIG. 41, but it is to be appreciated that a number of packet routing nodes are arranged in a hierarchical manner between the SGSNs 202 and the GGSNs 204.

Thick arrow 212 schematically illustrates a shallow routing update, in accordance with the procedures previously described, occurring in the IP network 200 in response to the mobility of mobile node 208 from radio network portion 210A to radio network portion 210B. Thick arrow 214 schematically illustrates a similar shallow routing update occurring in IP network 200 due to a further instance of mobility of mobile node 208 from radio access network portion 210B to radio access network portion 210C. Thick arrow 216 schematically illustrates a deep routing update, using procedures similar to that described above, occurring in IP network 200 following a subsequent instance of mobility into radio access network portion 210C. Thin arrows 218 schematically illustrate routing paths within the IP network 200 following the deep routing update 216.

In summary, the routing protocol modifications, which may be used alone or in any combination, provided by the present invention include:

1. Storing distinctive routing protocol data ("negative" height reference levels in the case of the TORA protocol) generated as a consequence of mobility, so that packets are forwarded towards the most recently-assigned downstream neighbour.
2. Incorporating unicast-directed mobility updates to adjust routing on handover by altering routing protocol data stored in only a limited set of the nodes of an AS.
3. Incorporating restoration updates to at least partially erase the effects of handover-based mobility ("negative" height reference levels in the case of TORA).

It is to be appreciated that the above-described embodiments are not intended to be limited, and that modifications and variations will be envisaged by the person skilled in the art.

The above-described embodiments describe a modified routing protocol based on the TORA routing protocol. However, aspects of the invention may be utilised to modify other known routing protocols, such as OSPF, RIP, etc.

Furthermore, although in the above-described embodiments the infrastructure of the Autonomous System is fixed, it is to be appreciated that one or more of the routers in the infrastructure may be mobile routers, such as used in the field of satellite communications, and other systems in which one or more routers in the infrastructure exhibit long-term mobility.

What is claimed is:

1. A method of controlling routing of packets in a packet switched network including an infrastructure of packet switching nodes interconnected by packet transport links, and a plurality of access nodes to which a routing path, defined by routing entries held in packet switching nodes located along said routing path, may be directed in said infrastructure for a given network address, said method comprising:

allocating a first said network address to a first mobile node being served via a communications link by a first access node, at least a first routing path in said infrastructure being directed to said first access node for said first network address;

altering routing in said infrastructure when said first mobile node receives service from a second access node, such that at least a second routing path in said infrastructure is directed to said second access node for said first network address, said second routing path being defined at least in part by one or more host-specific routing entries;

during a period of subsequent inactivity, removing said one or more host-specific routing entries from said infrastructure such that said mobile node has no current routing path in said network; and during said period of inactivity, providing two separate states for said mobile node:
 a) a state in which said mobile node retains said first network address; and
 b) a state in which said first network address may be reallocated to a different mobile node.

2. A method according to claim 1, wherein said step of removing host-specific routing is conducted by a routing erase message propagated from said second access node.

3. A method according to claim 2, wherein said step of removing host-specific routing is initiated by the second access node.

4. A method according to claim 2, wherein said step of removing host-specific routing is initiated by the mobile node.

5. A method according to claim 1, wherein in state a) the mobile node is arranged to re-establish host-specific routing by initiating a route injection process at a new access node when the mobile node again becomes active.

6. A method according to claim 1, wherein in state b) the mobile node is arranged to request the allocation of a new network address when the mobile node again becomes active.

7. A method according to claim 1, wherein entry into states a) and b) is controlled by timers.

8. A method according to claim 7, wherein state a) is arranged to precede state b).

9. A method according to claim 1, wherein said communications links is a wireless link.

10. A method according to claim 1, wherein said network address is an Internet Protocol (IP) address.

11. Routing apparatus comprising:

a plurality of routers respectively associated with packet switching nodes interconnected by packet transport links and arranged to carry out the steps of the method of claim 1.

* * * * *